US012701140B2

(12) United States Patent
Zeng et al.

(10) Patent No.: US 12,701,140 B2
(45) Date of Patent: Aug. 4, 2026

(54) COVERT AND RESILIENT COMMUNICATION OVER NON-COOPERATIVE NETWORKS

(71) Applicant: George Mason University, Fairfax, VA (US)

(72) Inventors: Kai Zeng, Fairfax, VA (US); Massieh Kordi Boroujeny, Fairfax, VA (US)

(73) Assignee: George Mason University, Fairfax, VA (US)

( * ) Notice: Subject to any disclaimer, the term of this patent is extended or adjusted under 35 U.S.C. 154(b) by 47 days.

(21) Appl. No.: 18/624,236

(22) Filed: Apr. 2, 2024

(65) Prior Publication Data

US 2024/0333767 A1     Oct. 3, 2024

Related U.S. Application Data

(60) Provisional application No. 63/494,001, filed on Apr. 3, 2023.

(51) Int. Cl.
    *H04L 9/40*       (2022.01)
    *H04L 9/32*       (2006.01)
(52) U.S. Cl.
    CPC ............ *H04L 63/18* (2013.01); *H04L 9/3263* (2013.01); *H04L 63/0428* (2013.01)

(58) Field of Classification Search
    CPC .... H04L 63/18; H04L 9/3263; H04L 63/0428
    USPC .............................................. 713/3
    See application file for complete search history.

(56) References Cited

U.S. PATENT DOCUMENTS

| | | | |
|---|---|---|---|
| 2014/0025952 A1* | 1/2014 | Marlow | H04L 63/0428 713/168 |
| 2018/0032446 A1* | 2/2018 | Amarendran | G06N 5/02 |
| 2021/0075772 A1* | 3/2021 | Tew | H04R 29/004 |

* cited by examiner

*Primary Examiner* — Jahangir Kabir
(74) *Attorney, Agent, or Firm* — Leveque Intellectual Property Law, P.C.

(57) ABSTRACT

A method, system and apparatus provides network communication between a sender and a receiver in a communication network. At a sender side of the network communication a ciphertext is encoded into a stegotext in a target language using a randomized language model, the ciphertext based upon an original content in a source language. The stegotext randomly generated by the language model to be decoupled from the original content and to have an assigned context in the target language that corresponds to the network communication in the target language. The stegotext is transmitted to a receiver over multiple communication channels of a communication network using one or more applications on an application layer of the communication network.

23 Claims, 19 Drawing Sheets

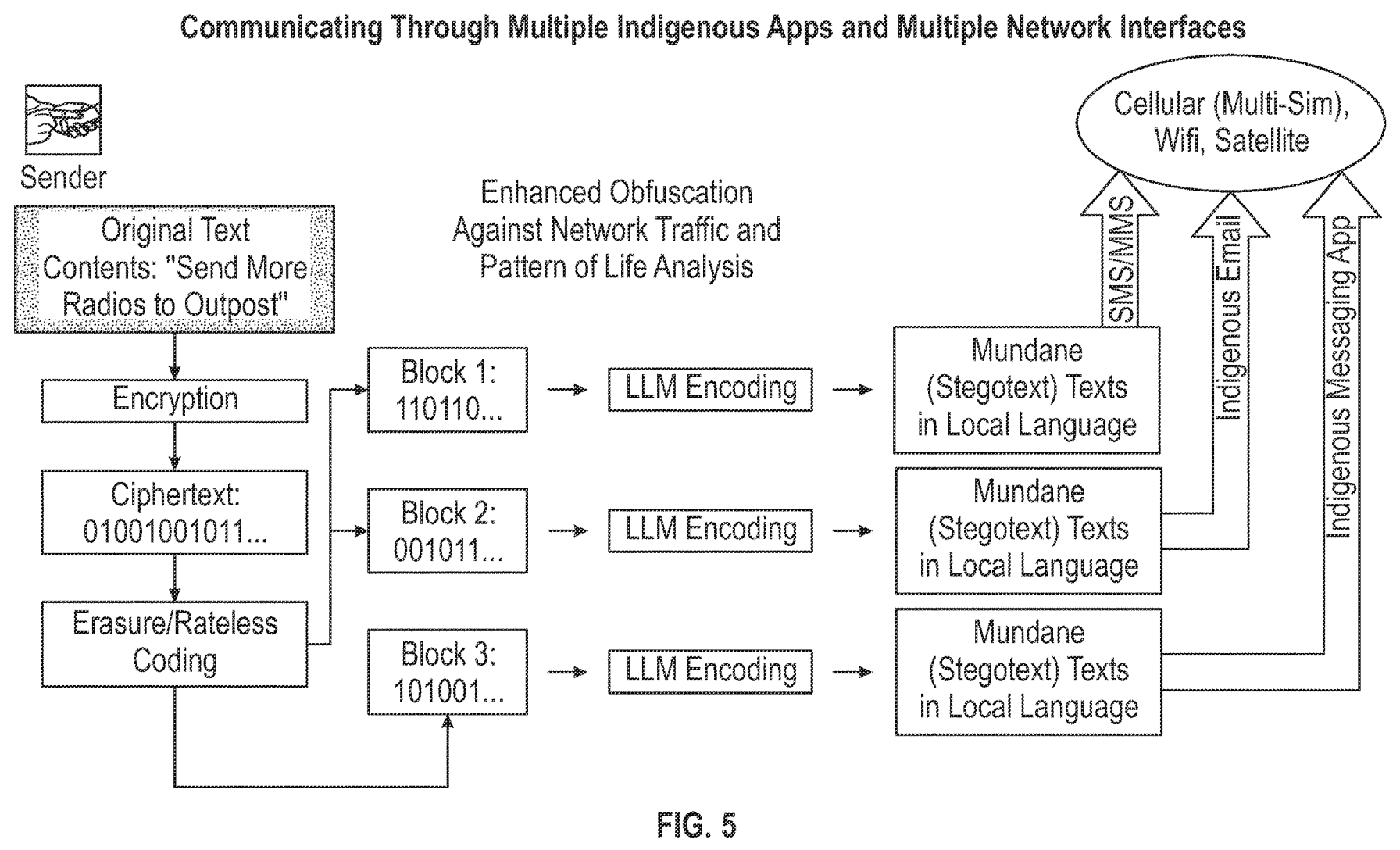

Communicating Through Multiple Indigenous Apps and Multiple Network Interfaces

Cellular (Multi-Sim), Wifi, Satellite

Indigenous Messaging App

Indigenous Email

SMS/MMS

Mundane (Stegotext) Texts in Local Language

Mundane (Stegotext) Texts in Local Language

Mundane (Stegotext) Texts in Local Language

LLM Encoding

LLM Encoding

LLM Encoding

Enhanced Obfuscation Against Network Traffic and Pattern of Life Analysis

Block 1: 110110...

Block 2: 001011...

Block 3: 101001...

Sender

Original Text Contents: "Send More Radios to Outpost"

Encryption

Ciphertext: 01001001011...

Erasure/Rateless Coding

FIG. 5

Synergy With Multichannel/Multipath Techniques:
Communicating Through Multiple Indigenous Apps and Multiple Network Interfaces (C): Making Ciphertext
Resilient Against Corruption
and Bit Errors (E): Forming Packets:
Adding Headers According
to the Designed Protocol

1200

Process of Generating Short Cover Texts:

10111001010100011101110010101

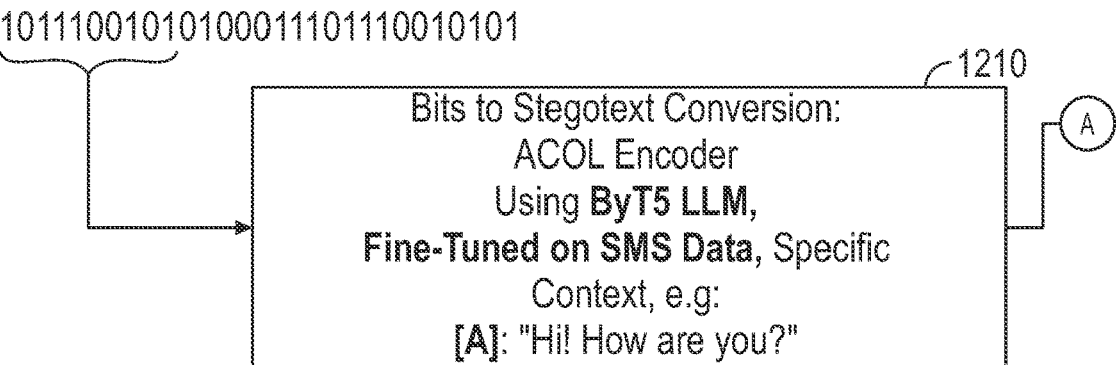

Bits to Stegotext Conversion:
ACOL Encoder
Using ByT5 LLM,
Fine-Tuned on SMS Data, Specific
Context, e.g:
[A]: "Hi! How are you?"

Ⓐ

1210

10111001010100011101110010101

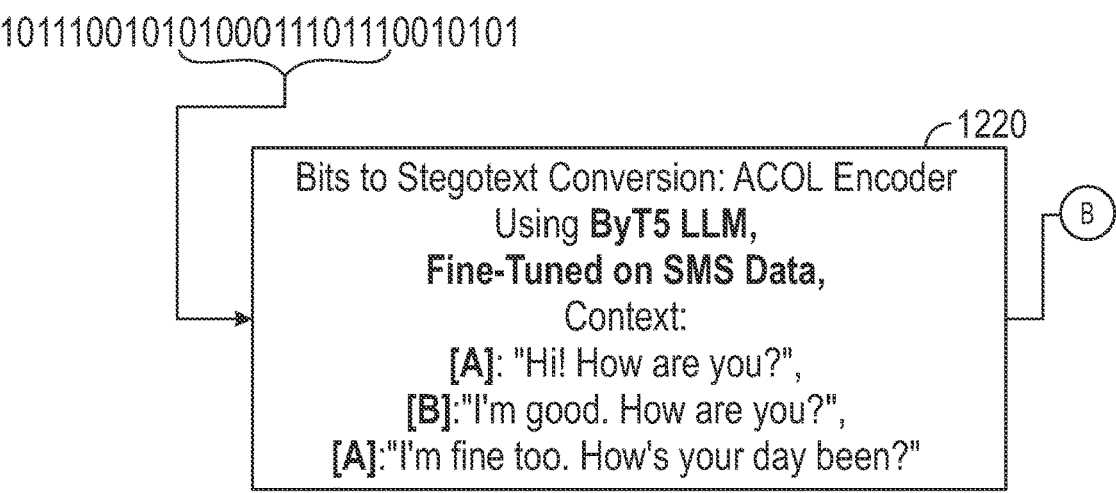

Bits to Stegotext Conversion: ACOL Encoder
Using ByT5 LLM,
Fine-Tuned on SMS Data,
Context:
[A]: "Hi! How are you?",
[B]:"I'm good. How are you?",
[A]:"I'm fine too. How's your day been?"

Ⓑ

1220

10111001010100011101110010101

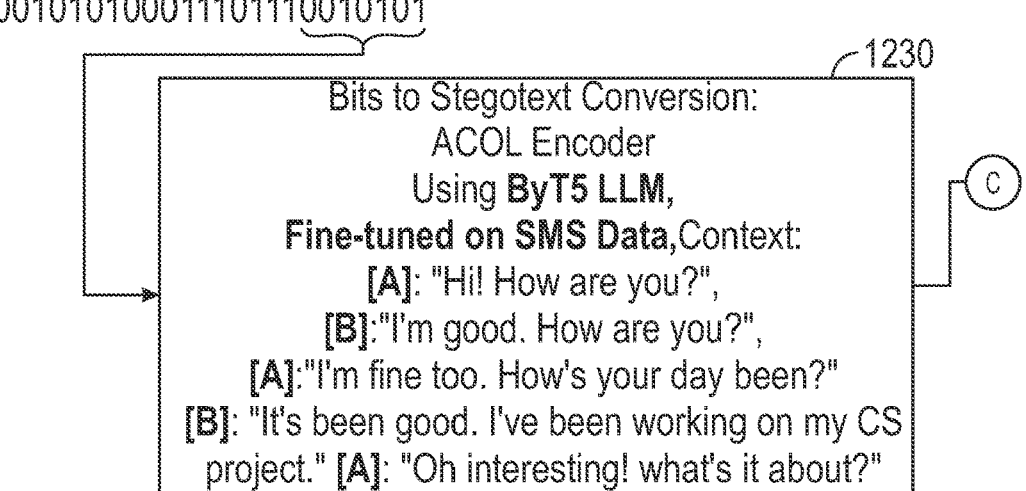

Bits to Stegotext Conversion:
ACOL Encoder
Using ByT5 LLM,
Fine-tuned on SMS Data,Context:
[A]: "Hi! How are you?",
[B]:"I'm good. How are you?",
[A]:"I'm fine too. How's your day been?"
[B]: "It's been good. I've been working on my CS
project." [A]: "Oh interesting! what's it about?"

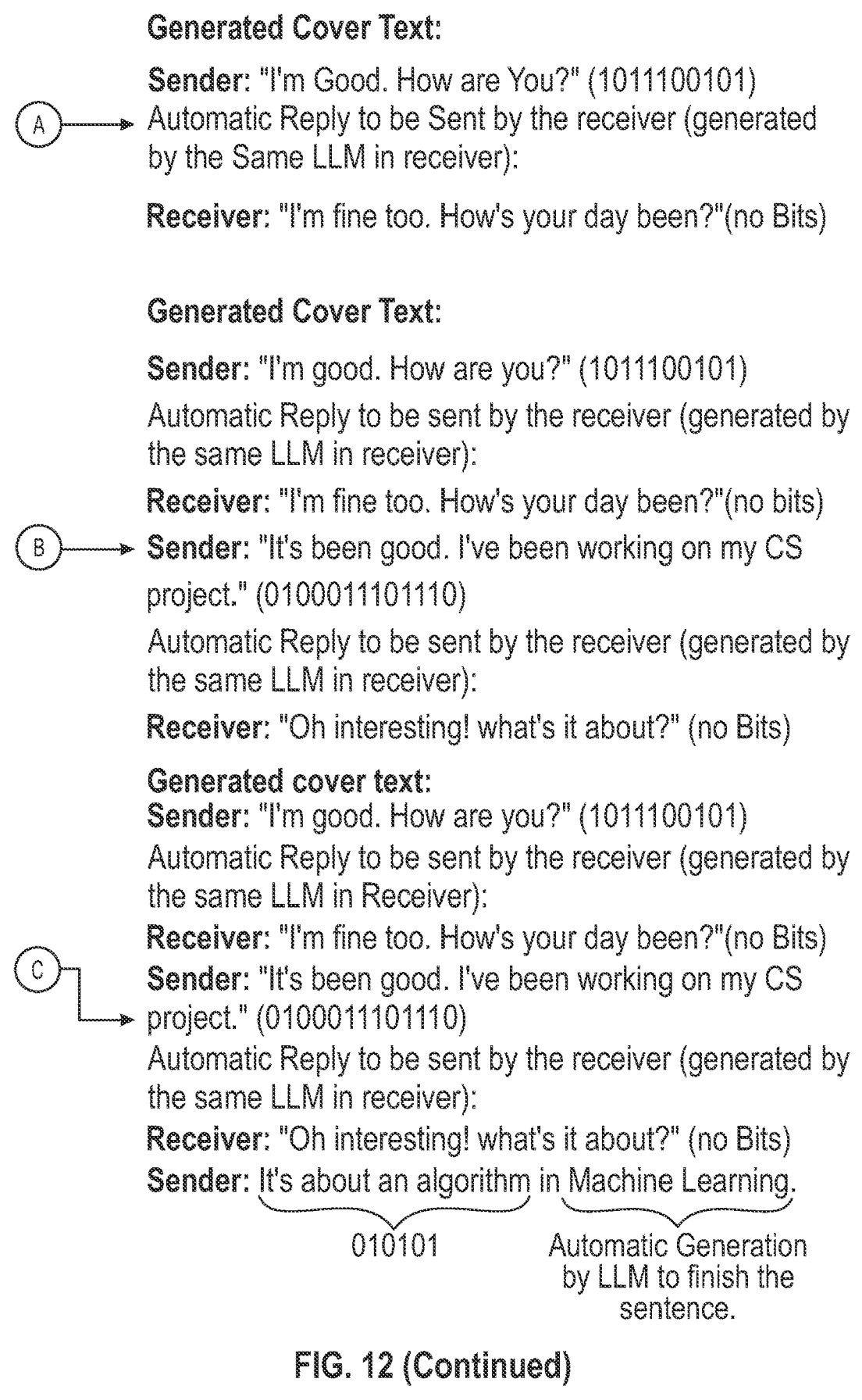

Generated Cover Text:

Sender: "I'm Good. How are You?" (1011100101)

Ⓐ ⟶ Automatic Reply to be Sent by the receiver (generated by the Same LLM in receiver):

Receiver: "I'm fine too. How's your day been?"(no Bits)

Generated Cover Text:

Sender: "I'm good. How are you?" (1011100101)
Automatic Reply to be sent by the receiver (generated by the same LLM in receiver):
Receiver: "I'm fine too. How's your day been?"(no bits)

Ⓑ ⟶ Sender: "It's been good. I've been working on my CS project." (010001101110)
Automatic Reply to be sent by the receiver (generated by the same LLM in receiver):
Receiver: "Oh interesting! what's it about?" (no Bits)

Generated cover text:
Sender: "I'm good. How are you?" (1011100101)
Automatic Reply to be sent by the receiver (generated by the same LLM in Receiver):
Receiver: "I'm fine too. How's your day been?"(no Bits)
Ⓒ Sender: "It's been good. I've been working on my CS
⟶ project." (010001101110)
Automatic Reply to be sent by the receiver (generated by the same LLM in receiver):
Receiver: "Oh interesting! what's it about?" (no Bits)
Sender: It's about an algorithm in Machine Learning.

010101          Automatic Generation
                by LLM to finish the
                sentence.

FIG. 12 (Continued)

Random Permutation Added to Arithmetic Coding (Language Obfuscation)

1300

1310 LLM (Context)

1320 {List of Tokens with Their Probabilities}

1330 Random Permutation of Token (With a Specific Key Shared Between Sender and Receiver)

1340 CDF of Permuted Tokens 1350 1011100101

1360 Converting Input Stream into a Rational Number in [0,1) and Locating it in the Formed CDF

1370

COVERT AND RESILIENT COMMUNICATION OVER NON-COOPERATIVE NETWORKS

RELATED APPLICATIONS

This application claims the benefit of provisional application Ser. No. 63/494,001 filed Apr. 3, 2023 and titled "Windtexter Alternative System," the entire content of which is hereby incorporated by reference.

GOVERNMENT RIGHTS

This invention was made with government support under grant number 2226423 awarded by the National Science Foundation. The government has certain rights in the invention.

BRIEF DESCRIPTION OF THE DRAWINGS

The accompanying drawings provide visual representations which will be used to describe various representative embodiments more fully and can be used by those skilled in the art to understand better the representative embodiments disclosed and their inherent advantages. In these drawings, like reference numerals identify corresponding or analogous elements.

FIG. 5 illustrates a communication system for communicating through multiple indigenous apps and multiple network interfaces from a sender side, in accordance with various representative embodiments of the present disclosure.

FIG. 12 illustrates the processing of generating short cover messages, in accordance with various representative embodiments of the present disclosure.

DETAILED DESCRIPTION

Figure 1:
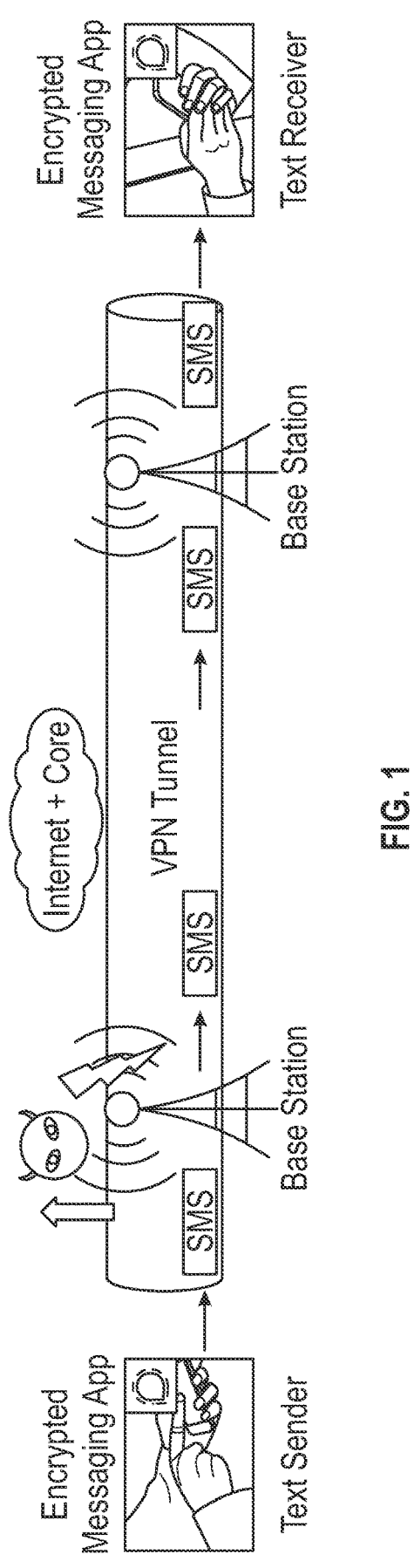
FIG. 1 depicts a communication network that users may use to send and receive communications, in accordance with various representative embodiments of the present disclosure.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

An embodiment of the disclosure includes a method including at a sender side of a network communication between a sender and a receiver in a communication network: converting, via a language model, an original content in a source language into a cover content in a target language, where the target language is decoupled from the original content and has a context that corresponds to the network communication; and transmitting, using one or more applications in an application layer of the communication network, the cover content to the receiver in the target language across one or more communication channels of the communication network.

An embodiment of the disclosure includes a further method including at a sender side of a network communication between a sender and a receiver in communication network: encoding a ciphertext into a stegotext in a target language using a randomized language model, the ciphertext based upon an original content in a source language, the stegotext randomly generated by the language model to be decoupled from the original content and to have an assigned context in the target language that corresponds to the network communication in the target language; and transmitting the stegotext to a receiver over multiple communication channels of a communication network using one or more applications on an application layer of the communication network.

An embodiment of the disclosure includes a system including communication channels in a communication network configured to support applications in an application layer of the communication network; a sender device of the system coupled to the communication channels in the communication network and configured to distribute a cover content intended for a receiver in a network communication using one or more applications across communication channels, where the cover content is decoupled from an original content in a source language and embedded within the cover content and has a context that corresponds to the network communication in a target language, with the cover content generated by a language model; and a receiver device of the system coupled to the communication channels in the communication network and configured to receive the cover content over the communication channels in the communication network, the language model configured to recover the original content from the received cover content.

An embodiment of the disclosure includes a further system including communication channels in a communication network configured to support applications in an application layer of the communication network; a sender device of the system coupled to the communication channels in the communication network and configured to convert an original message in a source language intended for a receiver device into context-relevant messages and distribute the context-relevant messages in a network communication using one or more applications across the communication channels, where the context-relevant messages are generated by the sender device using a language model and are decoupled from the original message and have a context that corresponds to the network communication in a target language; and a receiver device of the system coupled to the communication channels in the communication network and configured to receive the context-relevant messages over the communication channels in the communication network and invert the context-relevant messages using the language model to recover the original message from the context-relevant messages.

An embodiment of the disclosure includes a transceiver including a transmitter configured to transmit cover content intended for a receiver device in a communication network over communication channels in the communication network using one or more applications in an application layer of the communication network, where the cover content is decoupled from an original content in a source language and embedded within the cover content and where the cover content has a context that corresponds to a network communication in a target language; and a receiver configured to receive transmitted cover content over the communication channels in the communication network using the one or more applications in the application layer of the communication network, where a language model coupled to the receiver is configured to recover a transmitted original content embedded in the transmitted cover content received by the receiver.

With 5G, NextG and other wireless and cellular networks being progressively deployed worldwide, ensuring secure operation through 5G infrastructure is essential for military, government, and critical infrastructure applications. Convergence research and development are required to accelerate the transformation of technical innovations into viable products and solutions in the 5G domain.

Texting and phone call are commonly used for daily communication between soldiers, officers, and service teams deployed overseas on such communication networks.

The users usually have to rely on local cellular networks for most of their daily communication. However, end users face a dilemma between availability and security. On the one hand, the indigenous (local) short messaging service/multimedia messaging service (SMS/MMS) and voice service are universal for any cellular networks, in the sense that users can communicate anywhere and at any time as long as they connect to a mobile network and know the other side's cellphone numbers. However, when users send messages and/or talk through these indigenous 5G channels, a curious/hostile mobile service provider can easily monitor and/or intercept these messages/phone calls. Even when operating in an allied country or territory, end-users may be concerned about the potential risk of sensitive information being leaked to local operators and governments. On the other hand, the users might resort to encrypted messaging apps, such as Signal, iMessage, RCS (Rich Communication Services), etc. or use VPN to achieve end-to-end security. However, these traffics can be identified based on certain port numbers or traffic patterns, then they can get blocked or banned in certain countries, regions or territories, making them sometimes unavailable. Using a Virtual Private Network (VPN) or an alien messaging app may also easily attract unwanted attention from an adversary. The methods, systems and apparatus disclosed herein address this dilemma by achieving both universality and end-to-end security through indigenous communication network channels, such as 5G network channels.

Referring now to FIG. 1, a communication network that users may use to send and receive communications. Such indigenous 5G messaging and voice services may offer maximum availability but are not secure. Encrypted messaging apps and VPNs may provide security but they are not always available or safe. Users, therefore, face a dilemma between availability and security. On the one hand, although the short messaging service or multimedia messaging service is universal, when users send messages through these indigenous 5G channels, a hostile service provider can easily monitor and intercept these messages. On the other hand, the users might use encrypted messaging apps, such as signal, WhatsApp, etc. or use VPN to achieve end-to-end security, these traffics can be identified and blocked in certain countries and conflict zones, make them not available all the time. Such a 5G cellular service provider may not be fully cooperative or trustworthy, resulting in the zero-trust adversary model shown in FIG. 1. That is, the service provider may monitor and intercept the messages and information exchanged between users. An attacker who compromises certain components of the cellular network or network components between the communication parties may monitor and intercept the messages as well. They may detect or identify a user or traffic of interest by using various methods and technologies, such as traffic classification/identification, user profile identification, user identity identification (e.g., through image identification or audio/speech identification), deep packet inspection, etc. An encrypted messaging app could also be cracked by a sophisticated attacker/adversary either through an undisclosed mechanism or due to intended design purposes.

The systems, apparatus and methods presented herein provide secure, covert, and resilient communication for end users through noncooperative 5G networks and remain compatible with existing and future generations of cellular networks. A native or local solution for enabling end-to-end secure communication over indigenous 5G service (SMS/MMS/Voice/Image, etc.) treats the service as transport channel and adds an end-to-end security protocol on top of it. However, an adversary (e.g., service provider) would observe garbled contents in the channel, which may raise attention or suspicion that the users are using encryption to hide information. Therefore, although this native solution can achieve end-to-end security, it will not offer covertness or imperceptibility and may result in a high probability of being detected or blocked, thereby putting the user at a high risk of being identified, traced, or even attacked.

To achieve the covertness and low probability of detection (LPD), the philosophy of hiding in plain sight is used. Original content is converted into a cover content in a local language under a customized context that looks normal and mundane hiding in a vast amount of consumer messages, and is therefore not likely to raise any attention from adversary in the first place.

Figure 2:
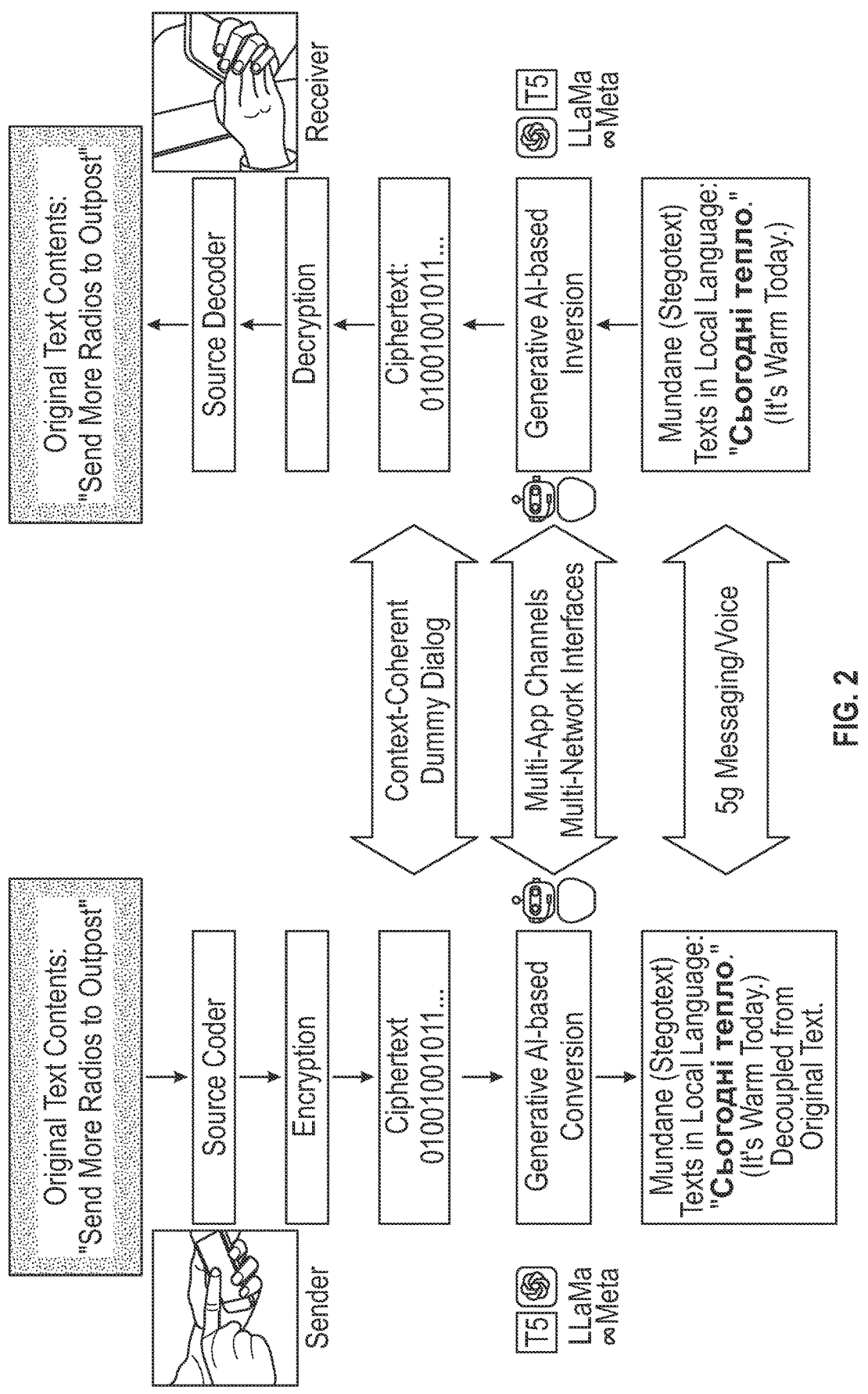
FIG. 2 illustrates a functional block diagram illustrates a system and process for achieving a desired communication environment, in accordance with various representative embodiments of the present disclosure.

Referring now to FIG. 2, a functional block diagram illustrates a system and process for achieving a desired communication environment, in accordance with the present disclosure. A messaging app active between the devices of a sender and a receiver can hide encrypted contents in mundane, normal sounding messages. In this example, a sender is sending a message "send more radios to outpost" on a sender device. This original content/message will be encrypted into a random bit string (ciphertext) using a shared secret key K between the sender and receiver devices. Then a generative AI-based conversion will be applied to convert the ciphertext into a mundane or normal stegotext in a local language. During the conversation, a natural language processing (NLP) module will convert the ciphertext into mundane text(s) in the local language. For instance, the message is converted to a sentence in Ukrainian which means "It's warm today," a message that is unrelated or decoupled from the original message. This cover message will be transmitted by the sender device through the SMS/MMS channel and because this cover content will hide in a massive amount of consumer messages, there is not a concern of the original message being detected or intercepted by the service provider or by any attacker in the middle of the network. At the receiver side, the receiver will reverse the data processing operations and retrieve the original message. The data processing required to implement this communication, such as by an application (app) that resides on the user devices, is fully transparent to the users, who will have similar user experience as using SMS or other messaging apps in the normal way. While the language of the original content in this example is the same language as the cover content, the original message language may or may not be the same as the local language of the cover message(s).

To further obfuscate the traffic pattern, this communication approach, implemented by a messaging app on the two user devices, uses the power of NLP to apply chatbots to generate dummy dialog to obfuscate the communication and the traffic pattern. Chatbots generate context-coherent dummy dialog with randomized and customized frequency, time, and receivers. Therefore, the user profile and metadata of the communication are obfuscated, thereby making it difficult for an attacker to identify the real communication messages/traffic or the user profile of the sender and receiver users. This communication app can further be integrated with multi-path and multi-interface techniques to distribute the messages/traffic through multiple indigenous (local) app channels (e.g., SMS/MMS, email, voice, messaging apps) and network interfaces, such as cellular, WiFi, and Satellite.

Figure 3:
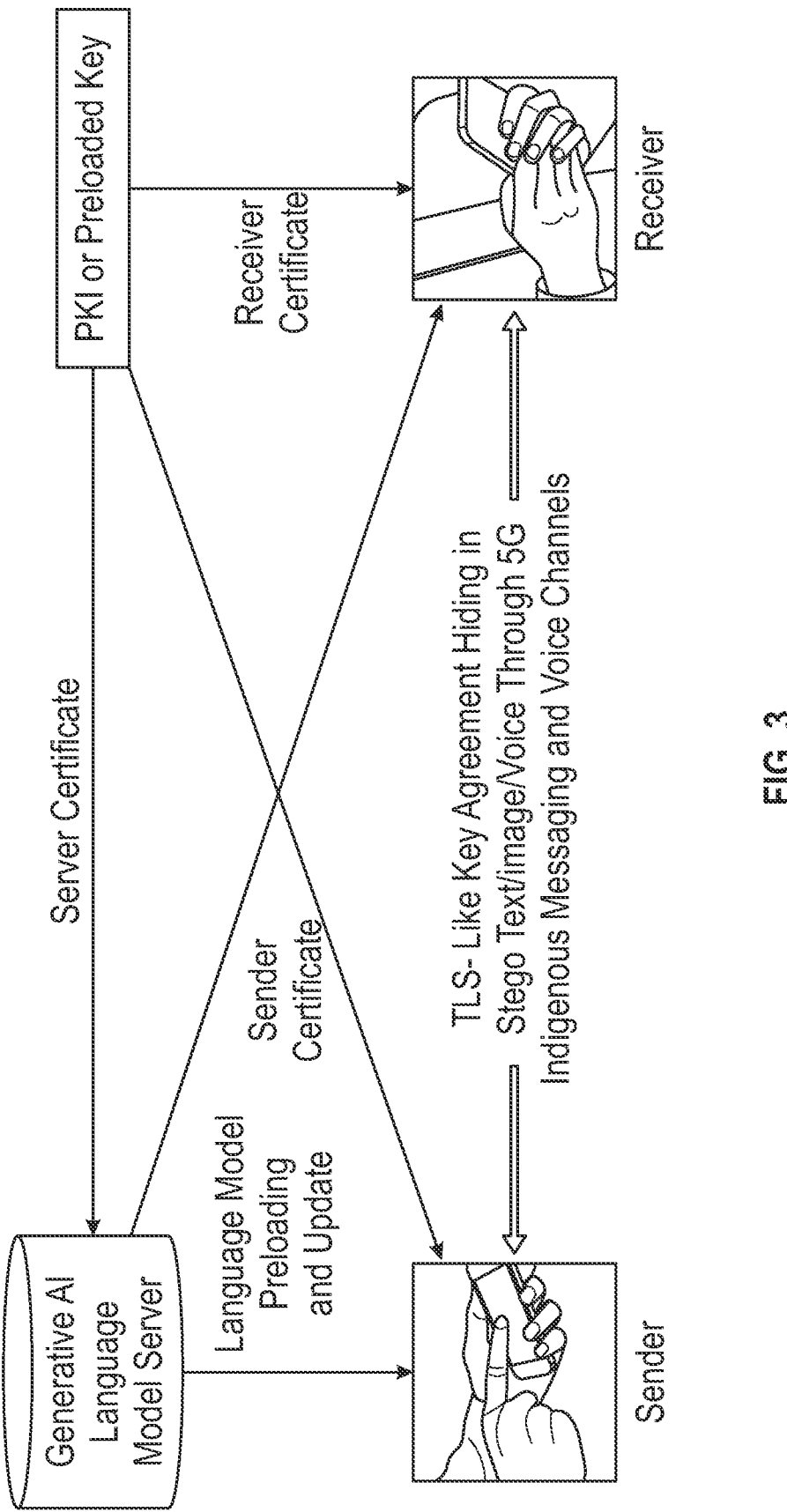
FIG. 3 depicts network infrastructure that supports network communications, in accordance with various representative embodiments of the present disclosure.

Referring now to FIG. 3, the network infrastructure that supports such network communications in accordance with the various network communication embodiments described here is shown. A public key infrastructure, such as DOD PKI or a preloaded key, may be used for key management and will securely distribute the public key certificate to users, thereby allowing the users to perform a TLS-like key agreement as shown to establish a covert and secure messaging session. The language model server, shown as a generative artificial intelligence model server for example, supports language model maintenance and updates as needed on the system and on individual user devices (sender and receiver). The language model, such as a NPL converts original content and hides it within mundane and normal cover content and is undetectable by human or machine, thus rendering the change of detection or interception a very low probability.

Compared with known encrypted messaging apps and SMS/MMS, the present disclosure offers universality and high interoperability for SMS/MMS messaging, while offering many desired features that are not available in either encrypted messaging apps or SMS/MMS. By leveraging artificial intelligence (AI) and advancements in NLP, covertness and low probability of detection/intercept (LPD/LPI) are obtained, with secret information hidden in mundane contents in a local language. Converting original content and hiding it within cover content provides covertness, whether hiding text in text; hiding dialog in mixed, multi-modal text, image and voice; and/or hiding voice in voice. Hiding content in multiple indigenous apps across multiple network interfaces, such as mobile, cellular, satellite, provide covertness, capacity and resilience advantages. The use of NLP chatbots to generate dummy (cover) messages and transmit them over multiple network channels provides traffic pattern obfuscation in volume and time. Further, NLP-based dial content customization provides user profile obfuscation. The use of bit-string ciphertext and randomly generated stegotext by NLP language models provides for zero-ambiguity translations.

In accordance with various embodiments described herein, random bit stream (ciphertext) is encoded into a mundane, cover message generated from a trained and randomized language model in an arbitrary language, such as a local language, thereby avoiding information loss or ambiguity normally encountered in translation in which a sentence in one language translated into another language may not be translated back as the original sentence. The content generated in accordance with various embodiments is cover content that is fully decoupled, i.e. unrelated, from the original content. Furthermore, the contents can be generated according to a customized context. The user profile and network pattern of life can be obfuscated by chatbots according to a profile template.

Further the approach described herein supports self-auditing through NLP to check whether user-inputted information complies with an information control policy, and will alert users about potential risks of using certain communication channels. As described herein, the messaging app supports multimedia communication, including text, interactive voice message, audio, images, video conferencing and video clip sharing, just like other common messaging apps.

Steganography is an art of encoding a plaintext message into another form of content (called stegotext) such that it appears similar enough to innocuous content (called cover or covertext) that an adversary would not realize that there is hidden meaning. According to the type of cover text, steganography techniques can be classified into text, image, audio, video, and network traffic ones. Generative AI-based steganography techniques, such as generative linguistic steganography, generative image steganography, and generative audio steganography, can achieve a much higher embedding capacity, efficiency, covertness, and imperceptibility than non-AI-based ones. Furthermore, generative methods can easily control the attributes of the generated stegotext, such as its topic (e.g., daily communications or comments on news events), style (e.g., casual or formal), and language type (e.g., English or non-English), by fine-tuning, i.e. training, the model on data with the similar attribute.

The cover content/stegotext that is generated is coherent to both operational context (e.g., region, location, season, and time) and dialog context. For example, if one is talking about picking strawberries in the winter, this may not make sense and could raise attention from the adversary. The exchanged contents in the stegotext dialog should also be coherent. For instance, if the sender sends "It's warm today", the receiver should give a relevant reply, such as "Yes, it is", but unlikely a reply as "Polar bears live on north pole". The generated contents should follow the pattern or distribution of the contents exchanged in the utilized network channel.

When integrating steganography techniques with network communications, real-time performance is important and it is well to consider the tradeoff between channel capacity, embedding capacity, processing delay, realtime performance requirement, and user profile obfuscation. For example, image steganography usually provides much higher capacity than text steganography. However, images are not always sent in the MMS channel, otherwise the communications may not follow a typical pattern of content distribution in the channel. The cover text distribution of the channel and the usage pattern will put a constraint on what type of carrier (text, image, audio) to use and how often. Furthermore, each steganography technique may introduce different conversion delays, which will affect the real-time performance. In addition, the capacity and delay of the network channel are to be considered. A SMS/MMS channel is unlikely to provide the same realtime performance as a voice-over-IP (VOIP) channel. So if a real-time voice communication is to be hidden, a SMS/MMS network channel may not be a good option.

A trained language model (LM) may be stored on a User Device or User Equipment (UE) like a radio, cellphone, etc. that may be handheld to enable steganography functions. Both LM training and inference are undertaken. LMs can be efficiently trained on cloud GPU servers, for example. Alternately, existing LMs may also be used. While it may be preferable to train LMs on GPUs for efficiency purposes, running inferences with LMs does not require GPUs and can be finished in seconds per input using CPUs. The required memory and storage usage can be satisfied by most modern handheld devices as well. For example, a decently performing GPT-2 medium model needs merely ~1.5 GB storage. The memory usage will depend on the specific input length but will be similar to handling SMS-like inputs.

Because the technology rests on top of SMS/MMS/VOIP and indigenous messaging apps (e.g., RCS, WhatsApp, etc.), reliability control, asynchronous transmission, and message catching will all be handled by the utilized indigenous 5G service channel and app channels in use, thereby providing for ready scaling to support a large amount of users.

The messaging app described herein is configure to run on the user device, which allows covert and secure communications over a non-cooperative network. For a domestic cooperative network, for instance, some of the messaging app functions could be moved to the network edge to provide a messaging edge service to users without requiring them to install the messaging app on their smartphones or devices. This would allow the benefits of the messaging app to be accessible to a larger base of domestic users.

Figure 4:
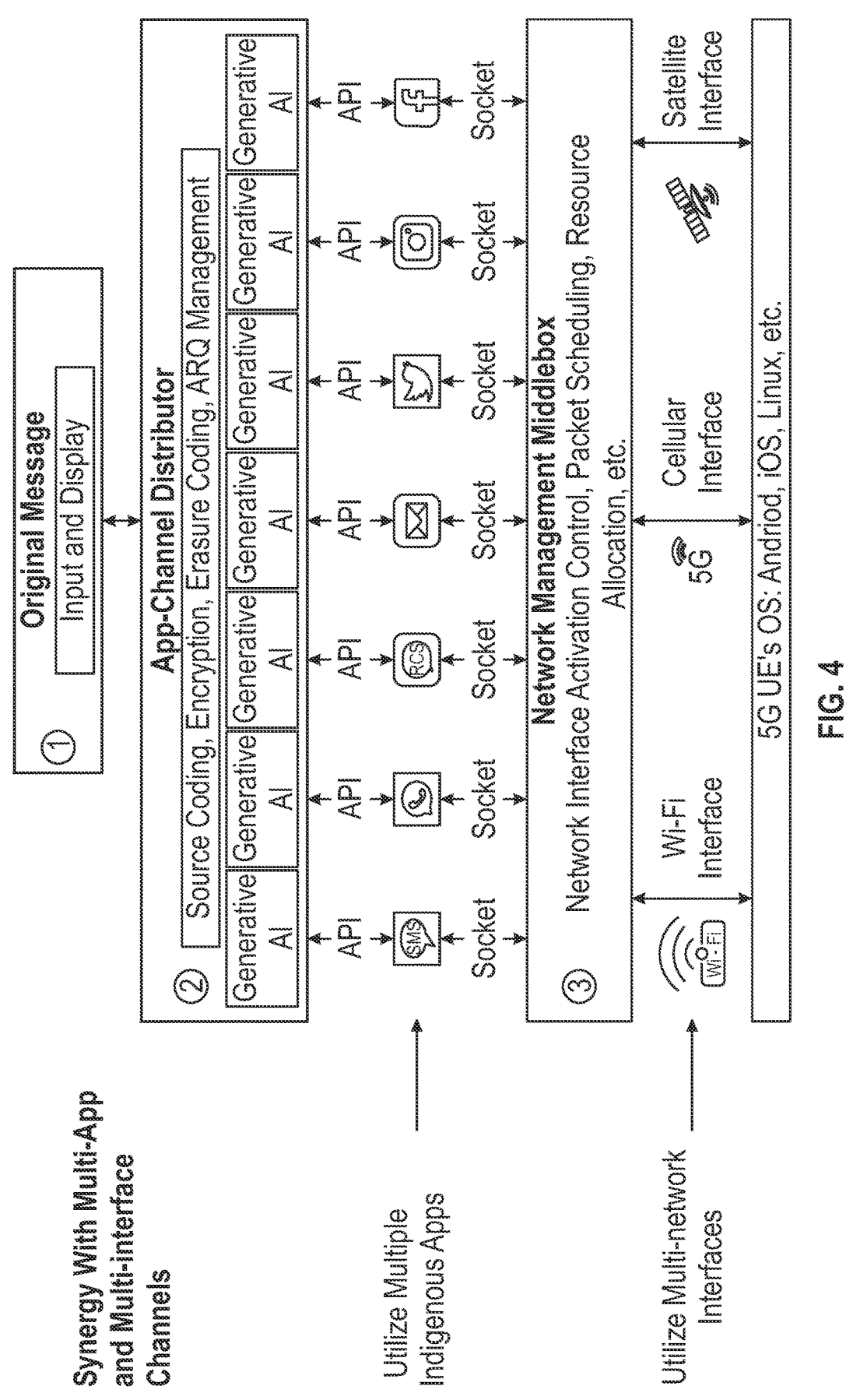
FIG. 4 depicts synergy with multiple apps and multiple interface channels in a communication network, in accordance with various representative embodiments of the present disclosure.

Referring now to FIG. 4, synergy with multiple apps and multiple interface channels in a communication network is shown. The messaging app(s) described herein has the capability to distribute its data traffic over different network interfaces (e.g., Wi-Fi, 5G cellular, and satellite) to add another layer of protection to the original messages.

An original message or content 1 may be input and displayed and can be transmitted or distributed over one or more apps on an application layer by an app channel distribution function 2 as shown. 5G UEs operating systems, such as Android, IOS, Linux, etc. may have communication network interfaces or paths, such as WiFi, cellular or satellite to a network management middlebox 3 that resides between various application sockets used by apps in an application layer. Examples of apps that may be active on an application layer of the network may be cellular phone, email, social media, image (camera), SMS/MMS apps as shown. For device that control access to Internet access, such as smartphone OS, a network management middlebox 3 is used to route data traffic from apps over different network interfaces.

The network management middlebox configuration may be determined by the amount of freedom given by the operating system (OS) of particular UEs. For 5G UEs that offer extremely limited degrees of freedom for the configuration of its network interfaces, middlebox 3 controls the activation or deactivation of its network interfaces. Specifically, middlebox alters the routing path of data traffic over the Internet by adaptively enabling/disabling some of its network interfaces. The network interface selection problem in middlebox in this case can be formulated as a stochastic optimization problem. Denote N as the set of available network interfaces (e.g., Wi-Fi, 5G, 4G, and Satellite) via which the UE can access Internet. The time is equally slotted and the resulting time slot is indexed by t=0, 1, 2, . . . . Denote an (t) as a binary variable. an (t)=1 indicates that the network interface n is active in time slot t and 0 otherwise. To meet the covertness requirements, a network interface cannot be active for more than T consecutive time slots. This constraint can be written as $P_{t+T-1}^{t'=t}$ an (t')≤T, $\forall$n, t. In each time slot, the messaging app can measure the delay experienced by its data packet and the average throughput of each network interface. Denote $r_n$ (t) as the average data rate of network interface n at the end of time slot t. Then, the optimization objective of middlebox can be written as $\max_{t\to+\infty} P_{n\in N}$ $r_n(t)a_n(t)$.

Where the UE's OS supports the simultaneous use of its multiple network interfaces, middlebox 3 manages the data traffic distribution over its network interfaces and performs online optimization for the data traffic distribution over the set of available network interfaces at the UE. M is denoted as the set of apps used for its data transmission. Denote $b_i(n,m)$ as a binary variable, where i is data packet index, m is app's index, and n is the network interface index. Specifically, $b_i(n,m)=1$ if the ith data packet from app m ∈ M uses network interface n ∈ N for transmission, and $b_i(n,m)=0$ otherwise. To enhance the covertness of its data traffic, the messaging app requires that no more than K consecutive data packets from the same app use the same network interface for transmission. This constraint can be mathematically written as:

$$P_{i+K-1}^{i'=i} \ b_i(m, n) \le K, \forall \ i, m, n.$$

The optimization objective of the middlebox is to maximize the long-term throughput, i.e., $\max_{t\to+\infty} P_{n\in N}$ $R_n(t)$, where $R_n(t)$ is the cumulative data traffic carried by network interface n for the app. Given the network dynamics, this problem is a stochastic optimization. Maximizing the overall throughput by adapting the capacity of each network interface while meeting the covertness constraints is of interest. A sliding-window-based algorithm only considers a fixed window of past rewards when estimating the reward distribution of each arm. This algorithm can adapt to changes in the reward distribution over time, while still maintaining some memory of past rewards. Second, a deep reinforcement learning algorithm is used to predict the "best" network interface for the next data packet from each app.

Source coding, encryption, erasure code, and Automatic Repeat reQuest (ARQ) functions as well as communications from an application programming interfaces (APIs) to generative AI blocks are handled by the application channel distributor 2. Multiple channels provided by multiple indigenous apps (e.g., SMS, Instagram, Twitter, Gmail, Facebook, etc.) running on the smartphone can be leveraged. The App-Channel Distributor 2, as shown in FIG. 4, aims to distribute the generated cover data traffic from the messaging app over multiple indigenous apps so that the original data traffic and the use of the cover app are transparent to the network service providers. Most indigenous apps provide API for developers in both Android and iOS systems. For instance, Twitter provides API tweepy in Python, by which one can send messages to or retrieve messages from the Twitter server as well as send messages to another Twitter user. Gmail provides APIs google.oauth2 and googleapiclient, which allow developers to achieve similar functions. Facebook provides facebook-sdk library for Python, which allows developers to interact with the Facebook platform and retrieve information about users, pages, groups, and other objects on the platform. In accordance with various embodiments presented herein, using apps' API to send the encrypted and NLP-encoded messages to its destination is beneficial.

With regard to the App-Channel Distributor 2, given a set of network interfaces selected by the MiddleBox and a message to be transmitted, the message is subdivided and encoded into submessages for multi-path transmission. Since data reliability is provided at lower layers, each path either delivers a submessage reliably or fails to deliver it at all when the path is unavailable, e.g., due to jamming by an adversary. Thus, erasure coding is an effective means to provide reliability at the application layer. An ARQ management system in conjunction with erasure coding handles cases in which an insufficient number of submessages is received to reconstruct the original message.

Referring now to FIG. 5, a communication system for communicating through multiple indigenous apps and multiple network interfaces from a sender side is illustrated. A sender user device or UE is used to send an original content, a message of "Send more Radios to Output." The UE device can be quipped with multiple SIM cards, thus can connect to multiple cellular networks simultaneously. To achieve both resiliency and covertness, NLP-based encoding and obfuscation techniques are used to convert a mission critical original text message into multiple syntax correct mundane texts, unrelated or decoupled from the original message sent over different networks.

When operating through a non-cooperative environment, a network connection or communication channel may become unavailable, e.g., a network or a service is shutdown or an app is blocked/banned. Communication resilience is achieved by enabling the capability of sending information through indigenous app channels and different network interfaces. Being able to convert a plaintext into a stegotext in a different type of message based on generative AI enhances the flexibility of utilizing different app channels, which also results in a higher degree of freedom for traffic obfuscation.

On the sender side, the encrypted message is converted to a bit stream of ciphertext 01001001011 split into three blocks in this example, Block 1, Block 2, Block 3 as shown. Large language model (LLM) or other LM encoding is performed by a language model (LM), such as a NLP model, to generate from the blocks of ciphertext mundane stegotext blocks that are each transmitted over various communication channels, like cellular, WiFi, satellite using various apps in the application layer of the network: SMS/MMS, indigenous email, and indigenous messaging app, as shown.

At a high level, LMs generate a text by recurrently picking the next token (e.g., a subword or a punctuation mark) from its vocabulary based on the current context, until they emit a special token signaling the end of a sentence. While these LMs have demonstrated superior performance in generating fluent and syntax-correct texts, this information is encoded by controlling which token to pick in each recurrent step. Formally, an LM takes as input a sequence of tokens $[x1, x2, \ldots, xn]$ (e.g., a partially generated text) and calculates the conditional probability for the new token, i.e., $P(xn+1|x1, \ldots, xn)$. A conventional LM then samples the next token $xn+1$ from its vocabulary based on solely this probability distribution, i.e., $xn+1 \sim P(xn+1|x1, \ldots, xn)$. To encode the ciphertext, this sampling process is modified in a way that the next token will be sampled based on both the LM-calculated probability distribution and the ciphertext to encode, i.e., $xn+1 \sim Pstego(xn+1|x1, \ldots, xn)$. This is achieved by performing Arithmetic Coding, which consumes one chunk of the ciphertext bit stream at a time and then picks the next token based on the probability score calculated from the bit chunk. To ensure good generation quality (i.e., avoiding dysfluent or unnatural language generation), in each recurrent step, the LM focuses on only a subset of the most probable K tokens in the vocabulary.

Figure 6:
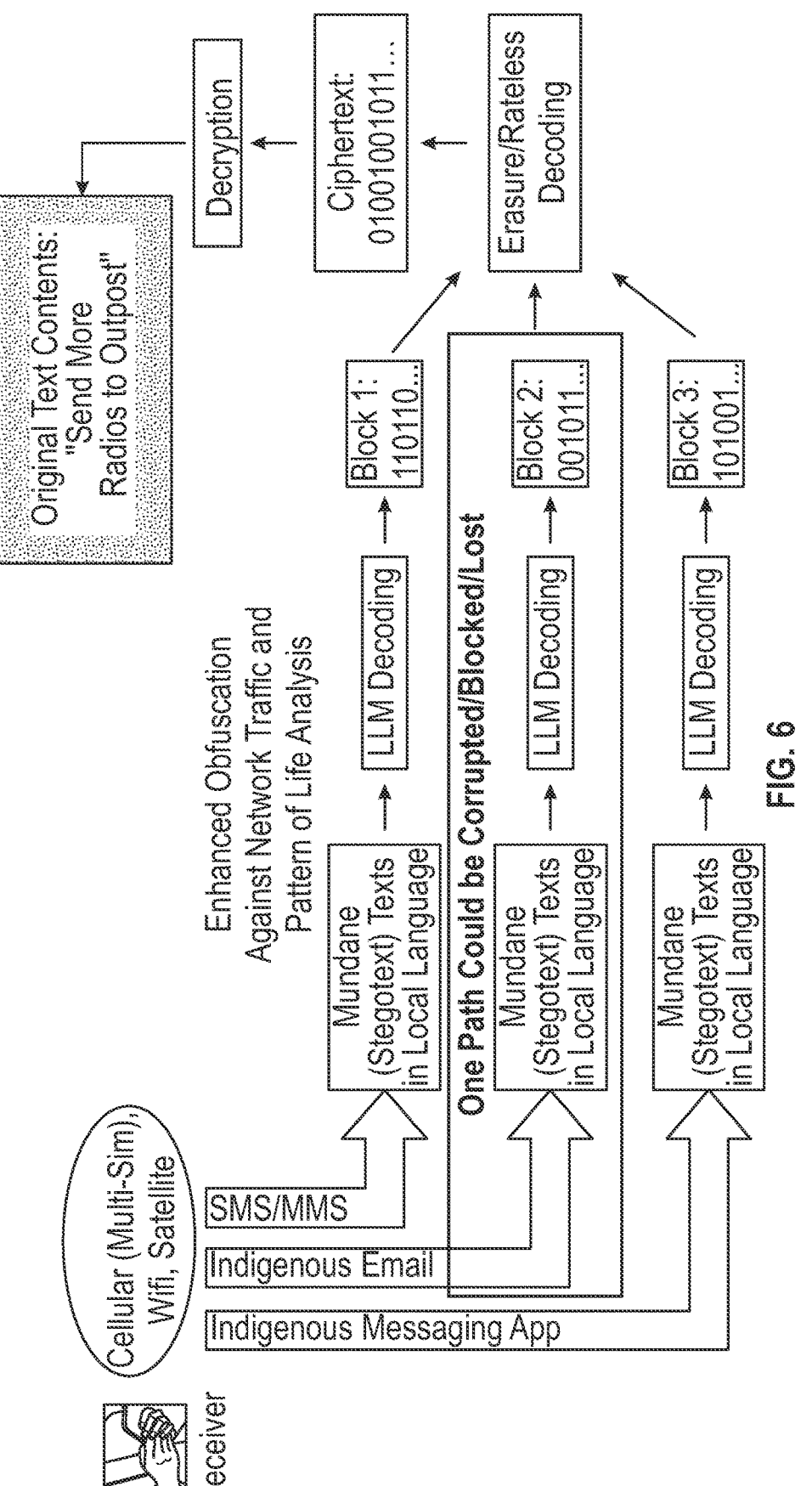
FIG. 6 illustrates a communication system for communicating through multiple indigenous apps and multiple network interfaces from a receiver side, in accordance with various representative embodiments of the present disclosure.

Referring now to FIG. 6, a communication system for communicating through multiple indigenous apps and multiple network interfaces from a sender side is illustrated. Whereas FIG. 5 illustrated original content conversation to cover content and distribution (transmission) thereof, FIG. 6 illustrates extraction and decoding from cover content back to the original content or message.

On the receiver side, the multiple cover message sent by the sender come across the communications network over a number of communication channels, whether cellular, WiFi, satellite, through any number of apps operating on the application layer of the communications network. These mundane, normal sounding stegotext in a local language of the conversation between the sender and the receiver are received by the receiver, decoded into blocks of ciphertext Block 1, Block 2, Block 3 as shown. They are aggregated and decoded to recover the ciphertext 01001001011, which is then decypted to recover the original message "Send More Radios to Output." Even if one or more network path, shown here at the path carrying the Block 2 stegotext, is corrupted, blocked or lost, the use of multiple stegotext messages in which the original content hides ensures that the ML can recover the original content.

Once the receiver receives the stegotext, it can extract the ciphertext by using the same LM used on the sender side, tracking its conditional probability distribution in each recurrent step, and then deriving the encoded bit chunk based on the probability score of the actual token in the stegotext. It can be seen that the information hiding and extraction processes of FIG. 5 by the sender/transmit side of the network communication are completely reversible as long as the sender and the receiver retain exactly the same LM.

It is noted that when adopting the commonly used GPT-2 as the LM, for example, this approach suffers from a severe "low conversion efficiency" issue. Specifically, even for encoding a short ciphertext, the GPT-2 approach requires generating a very long stegotext, typically containing 10× more words than the original text, making it unsuitable for SMS. While one may address the issue by sending a series of consecutive mundane messages, it will require a considerable amount of resources and this communication pattern itself can be an unconventional, easily detectable communication between the sender and the receiver. To mitigate this issue, a byte-level LM, such as ByT5 LM, is used in place of the traditional, subword-level GPT-2. Unlike GPT-2, ByT5 LM generates one UTF-8 byte (rather than a subword token) in each recurrent step. When using it as the LM, multiple bit chunks are encoded into each word in the stegotext (i.e., multiple bit chunks encode→multiple UTF-8 5 bytes correspond to→one word), in contrast to one bit chunk in each word when using GPT-2 (i.e., one bit chunk ncode & correspond to→one word).

Moreover, it is noted that using GPT-2 as the LM essay-like formal English is generated, which is very different from messages one would send/receive in SMS/MMS. The LM, such as the ByT5 LM, is trained on a dataset of SMS/MMS messages so that the LM can directly generate SMS/MMS-like stegotexts.

Figure 7:
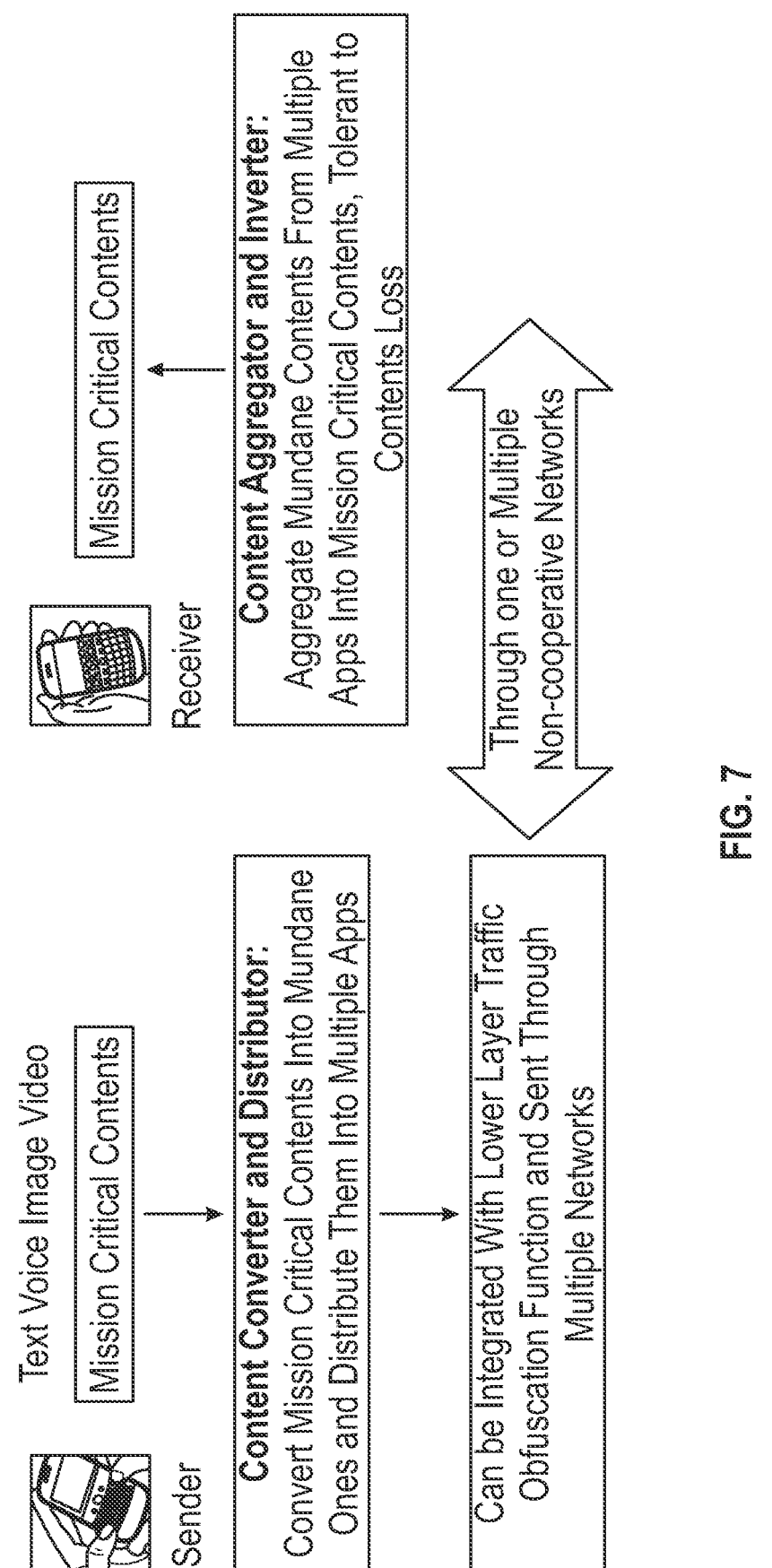
FIG. 7 illustrates a functional system diagram in which original content is hidden and transmitted, in accordance with various representative embodiments of the present disclosure.

Referring now to FIG. 7, a functional system diagram in which original content is hidden and transmitted within communication network is illustrated. In this example, mission critical information, which may be in text, voice, video, images, or some combination thereof, is provided by a sender using a sender device on a sender side of a network communication between the sender and a receiver on a receiver side. Original content or messages are converted into mundane, cover content messages and distributed using multiple applications (apps) over multiple network channels. This cover content, stegotext, can be integrated with lower layer traffic to further obfuscate the communication and send through one or multiple non-cooperative networks. At the receiver side of the communication, the stegotext cover content or messages are received from multiple apps and aggregated and inverted to recover the original content.

Figure 8:
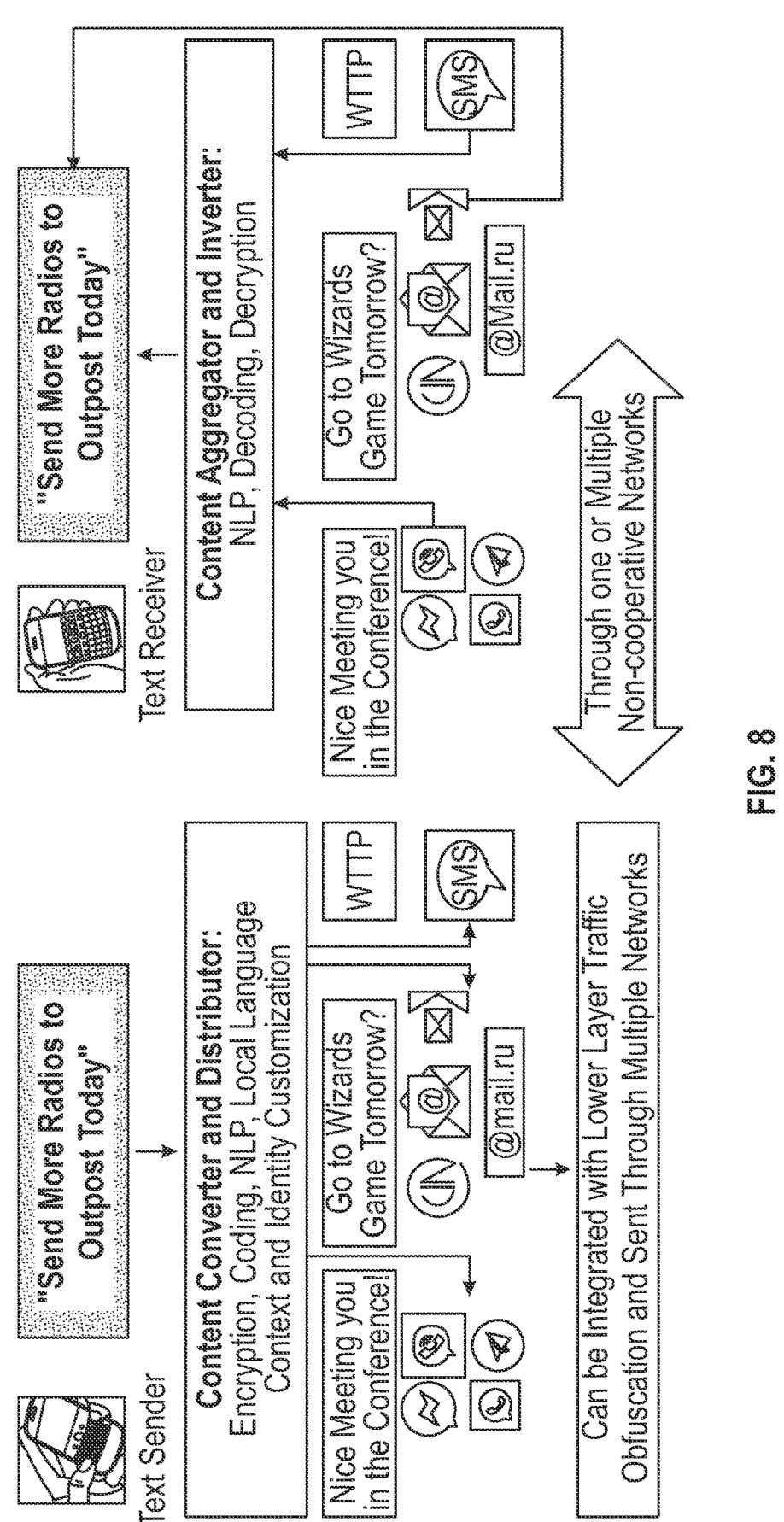
FIG. 8 illustrates an example of a network conversation between a sender and receiver in which the cover stegotext is multiple context-relevant messages in which original content is hidden, in accordance with various representative embodiments of the present disclosure.

FIG. 8 provides an example of a chat or network conversation between a sender and receiver in which the cover stegotext is multiple context-relevant messages. In a communication network have a number of communication channels that support a number of applications in an application layer of the communication network, a sender device and a receiver device are coupled to the communication channels and one or more apps in the application layer of the network. The sender device is configured to convert an original message in a source language intended for a receiver device into a number of context-relevant messages and distribute them using one or more applications across the communication channels. In this case the original message is "Send More Radios to Outpost Today" which through encryption, coding and use of a NLP ML is converted to context relevant messages (stegotext). In this example, the original content of the "Send More Radios to Outpost Today" message is converted to three context-relevant messages: "Nice Meeting you in the Conference", "Go to Wizards Game Tomorrow" and "WTTP" that are unrelated, decoupled from the original "Send More Radios to Outpost Today" message.

These stegotext cover messages are generated by the NLP ML have a context that corresponds to the network communication in a target language, which in this example is the same language as the original message, though that is not required. In the example shown, these context-relevant messages are shared over various apps available to the sender and receiver on the communication network, including messaging/call/text, email and SMS text messaging apps, respectively. Again this cover content, stegotext, can be integrated with lower layer traffic to further obfuscate the communication and sent by the sender through one or multiple non-cooperative networks.

These stegotext context-relevant messages are received on the receiver side of the communication by the text receiver and through content aggregation and inversion using the same NLP ML and decoding and decryption, the original message "Send More Radios to Outpost Today" is recovered and displayed, made available to the receiver.

Figure 9:
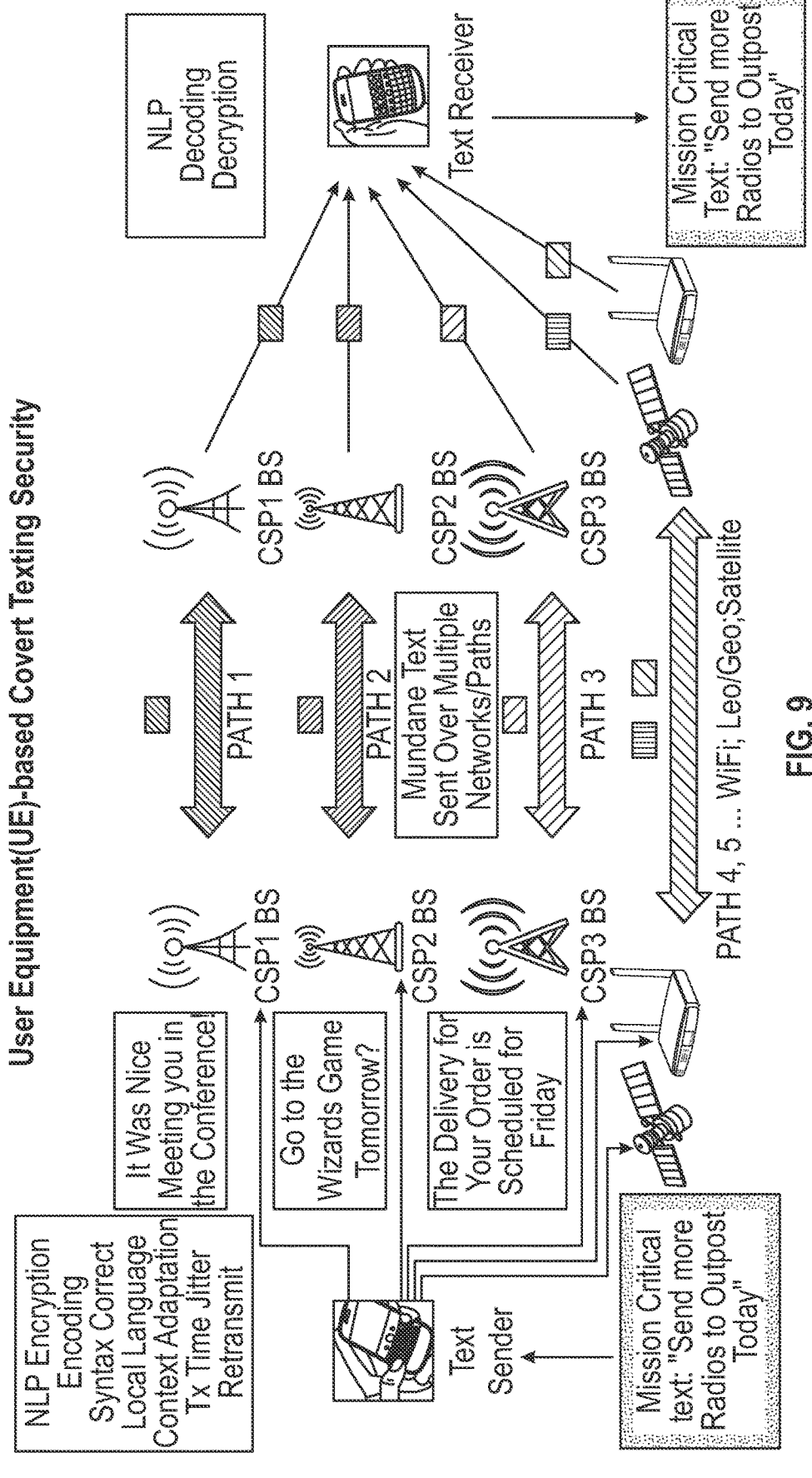
FIG. 9 depicts a further example of a communication network in which original content is hidden and transmitted, in accordance with various representative embodiments of the present disclosure.

In FIG. 9, a further example of a communication network in which original content is hidden and transmitted is shown. The sender device of the text sender communicates on the network via a number of network paths, including satellite, cellular base stations CSP1, CSP2, CSP3, Leo/Geo, and WiFi, using various messaging apps. The original message "Send more Radios to Outpost Today" is encrypted, encoded and transmitted as stegotext cover, mundane text messages "It Was Nice Meeting you in the Conference!", Go to the Wizards Game Tomorrow" and "The Delivery for Your Order is Scheduled for Nov. 15, 2022" on paths 1, 2, 3, 4, 5 as shown. On the receiver side, NLP ML is used, as well as decoding and decryption to recover and provide to the text receiver the original message.

Figure 10:
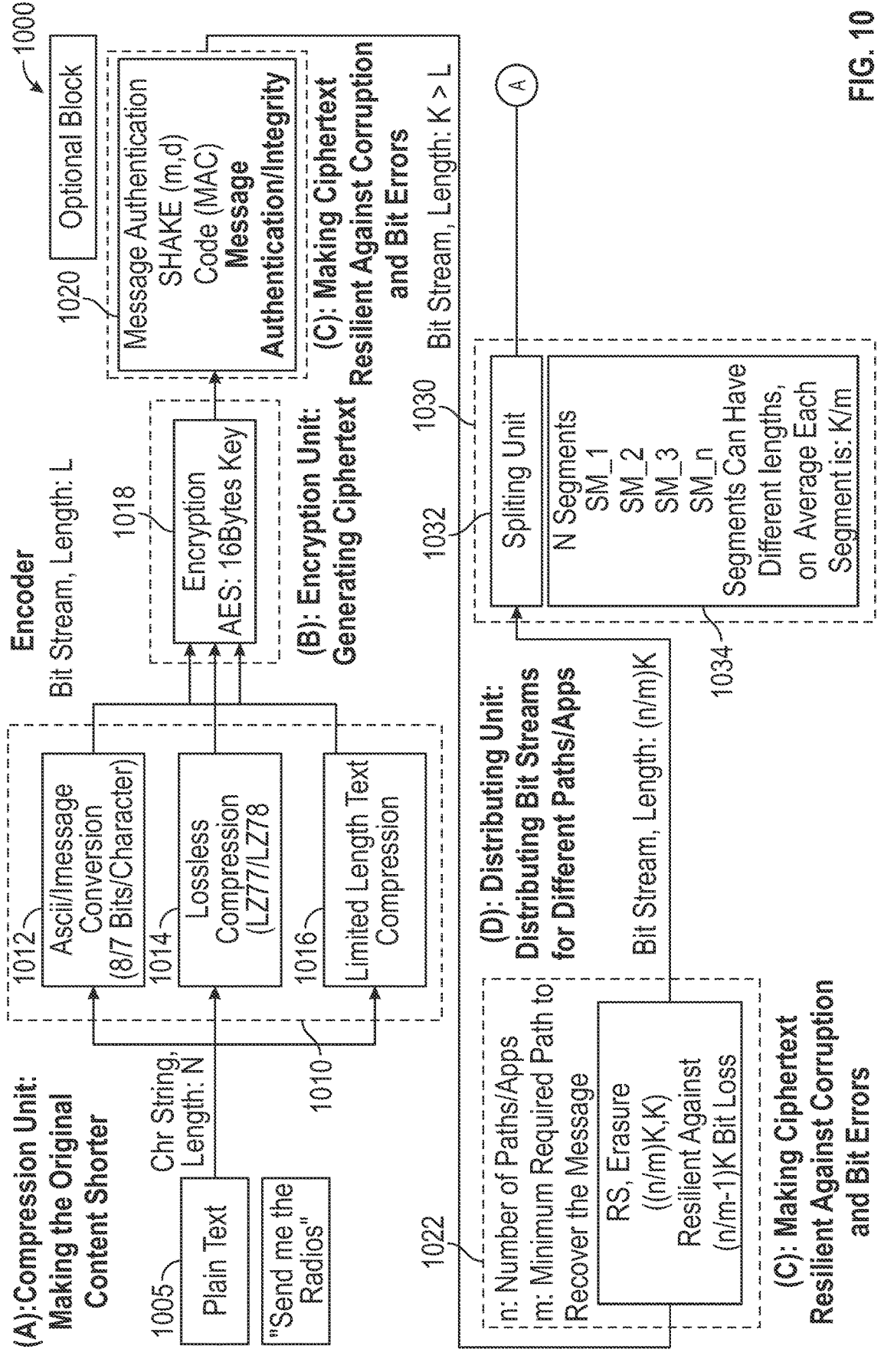
FIG. 10 illustrates content conversion and distribution/transmission on the sender side, in accordance with various representative embodiments of the present disclosure FIG. 11 illustrated packet format of a packet, in accordance with various representative embodiments of the present disclosure.
Figure 10:
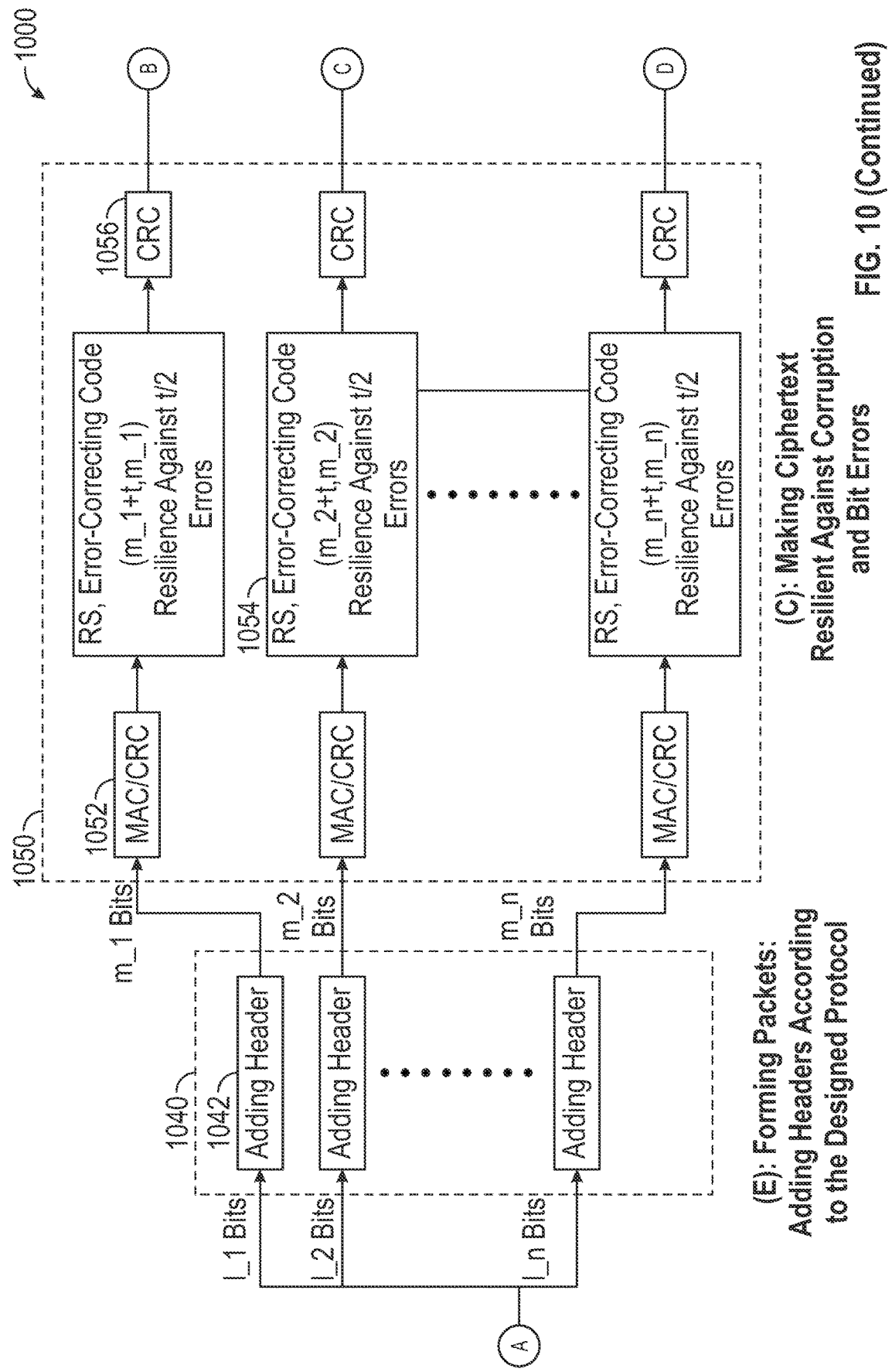
Figure 10:
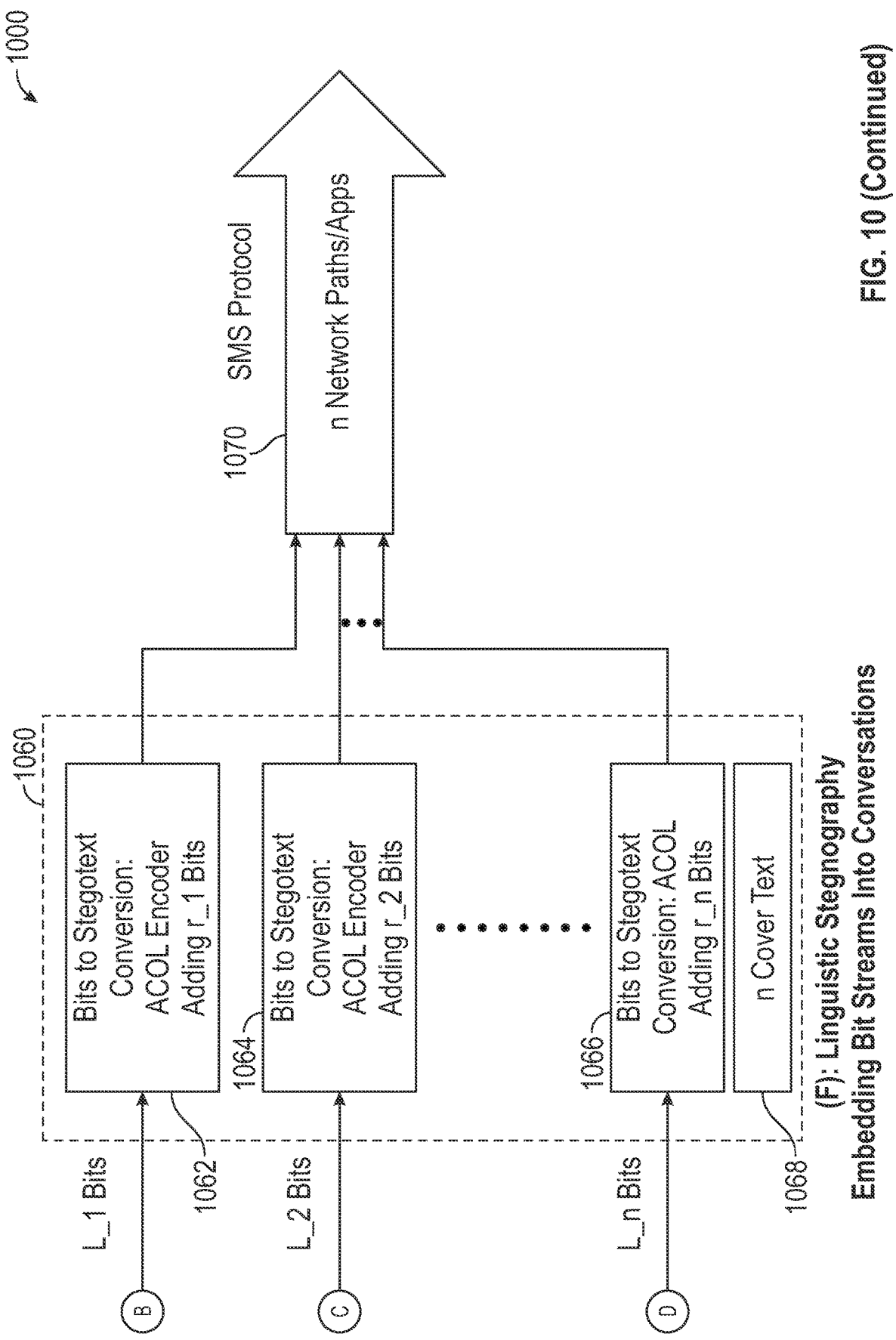

Referring now to FIG. 10, an example of the content conversion and distribution/transmission on the sender side, including encryption, coding, NLP ML function, context and identity customization, is illustrated. In the drawing, functional blocks (A), (B), (C), (D), (E), and (F) are shown:

(A) Compression Unit 1010—making the original content shorter. The original, plain text "Send me the Radio" have a character string length of N is provided to the Compression Unit 1010, having blocks 1012, 1014, 1016. Ascii/message conversion occurs at 1012; loss compressing, such as LZ77/LZ78 occurs at 1014; compression to provide limited length texts occurs at 1016.

(B) Encryption Unit 1018—generating ciphertext. At 1018, encryption of the bitstream, such as by an AES 16 Bytes encryption key is performed on the bit stream.

(C) Message Authentication—making ciphertext resilient against corruption and bit errors. At 1022 message authentication and integrity is performed. 1022 provides resilience against bit loss.

(D) Distributing Unit 1030—distributing bit streams for different paths/apps. Splitting unit 1032 splits the bit stream of the ciphertext into N segments SM_1, SM_2, SM_3, SM_4. These segments can be the same or different lengths of bits, with an average length of K/m.

Figure 11:
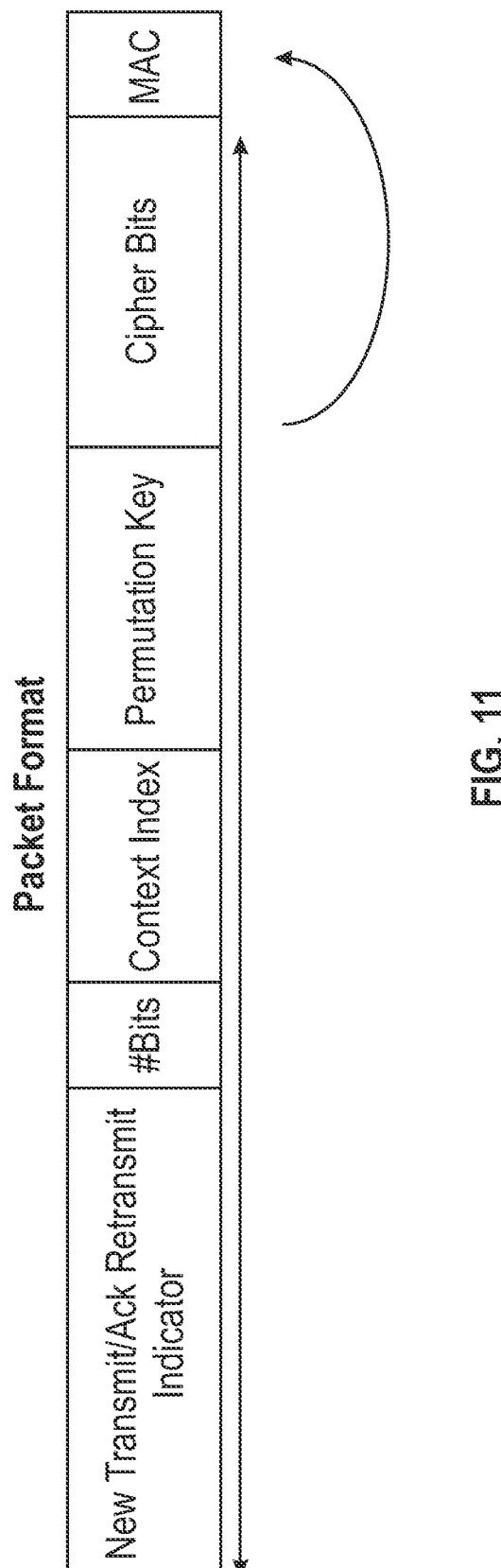

(E) Forming Packets 1040—adding headers according to design protocol. The segments having I_1 Bits, I_2 Bits, . . . , I_n Bits from the Distributing Unit 1030 are provided to 1040 and headers added at 1042, to generate packets m_1 Bits, m_2 Bits, . . . , m_n Bits as shown. An example packet format 100 is shown in FIG. 11. Other packet arrangements are contemplated and may be used.

(C) Message Authentication. At 1050 packets m_1 Bits, m_2 Bits, . . . , m_n Bits are provide to MAC/CRC units 1052. At 1054, RS, error-correction resilience is applied to generate CRCs 1056 to generate packets having L_1 bits, L_2 bit, . . . , L_n bits, as shown.

(F) Linguistic Steganography-embedding bit streams into conversations. The packets having L_1 bits, L_2 bit, . . . , L_n bits from block 1050 are provided to 1060 as shown. Blocks 1062, 1064, 1066 perform Bits to stegotext conversion using an Arithmetic Coding with Obfuscated LLM (ACOL) Encoder that adds r_1 Bits, r_2 bits and r_n bits, respectively, that great n Cover Stegotext at 1068.

The n Cover Stegotext in n context-specific messages are transmitted using n Network paths and apps 1070 as shown.

FIG. 12 illustrates the processing of generating short cover messages, in accordance with various embodiments of the disclosure. For a ciphertext given by 1011100101010001110111001010 1 for this example, the process for generating context-specific cover stegotexts is illustrated. It can be clearly seen that the context of the generated messages between participants [A] ad [B] are relevant to the conversation that is being developed as the conversation progresses from Block 1210 to 1220 to 1230. NLP ML is used to automatically create the messages in this contextual, natural sounding conversation.

In ACOL encoding, in order to generate a cover text to embed the input bit stream, a language model may generate the probability distribution of the next token, given already generated context. As previously mentioned, ByT5 LLM works with character tokens and has a higher embedding capacity, i.e. number of bits that can be embedded in a text, than other LLMs with word tokens, such as GPT-2. The ByT5 LM model can be fine-tuned on SMS data in different languages, so the generated cover text will be in form of short SMS like messages. The initial context for generating the probability distribution of tokens (characters) is decided between sender and receiver based on the "Context index" in the packet header. This context can be chosen according to the geography, time of the year, and the user profile. For example, if the messaging app is used in Russia, in winter time, with sender and receiver disguised as teenagers, the overall conversation would be about something typical teenagers in Russia in the winter talk about (context relevant) and their language of their conversation will be in Russian.

In ACOL encoding, arithmetic coding is used to map bit streams into tokens. At first a map stream is converted into a rational number in [0,1), and based on that a token is chosen based on its probability given by the LLM. A modified version of arithmetic coding is used, in which the tokens are not sorted by their probabilities in forming the cumulative distribution function (CDF). The CDF in ACOL is formed from a permutation of the tokens. This pseudo random permutation is formed using the "Permutation key" sent in the packet header, so the sender and receiver will use the same permutation. Using this pseudo random permutation, an attacker with even the knowledge of the context cannot decode the cover text.

Figure 13:
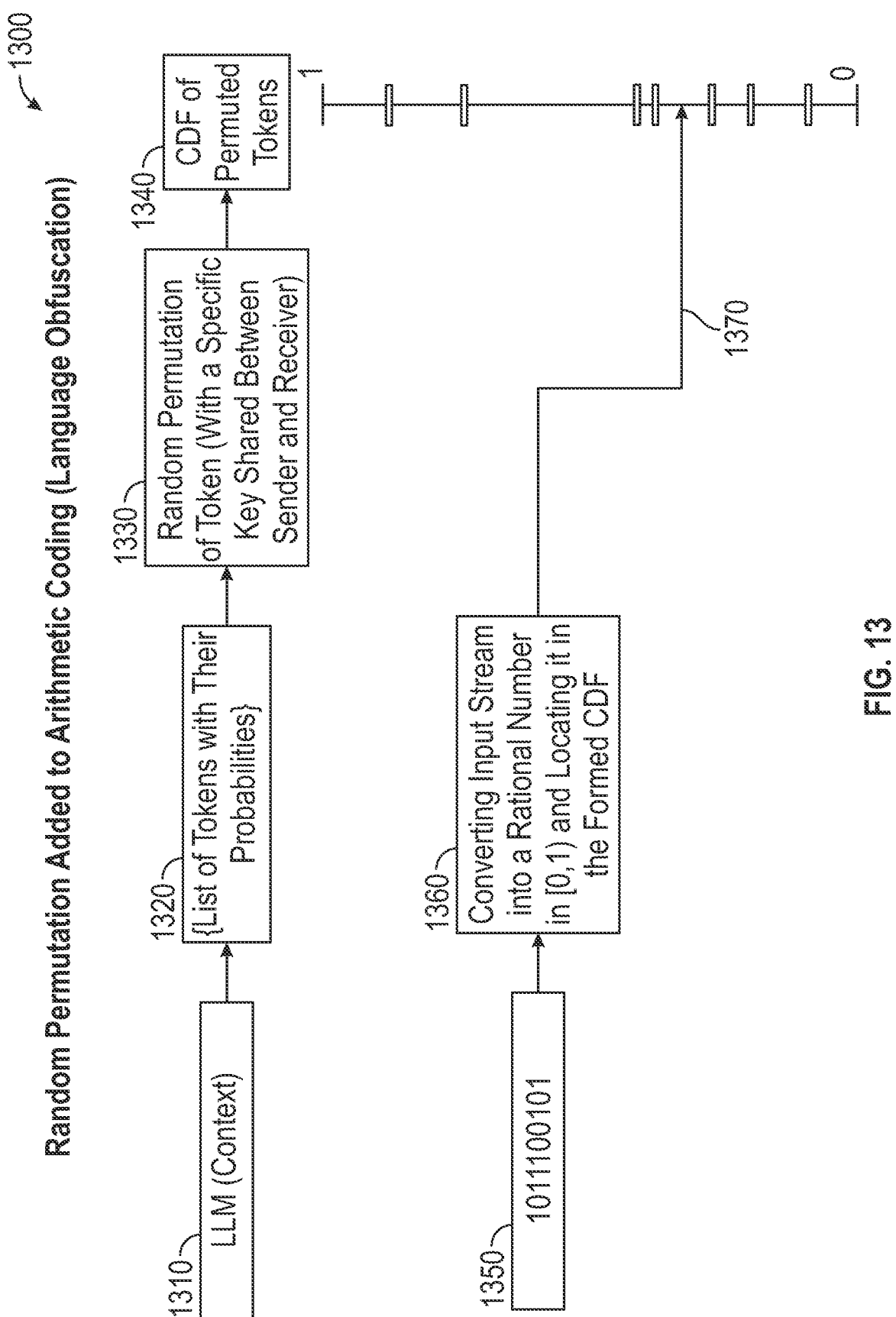
FIG. 13 illustrates random permutation added to arithmetic coding to obtain desired language obfuscation, in accordance with various representative embodiments of the present disclosure.

Referring now to FIG. 13, random permutation may be added to arithmetic coding to obtain desired language obfuscation. In block 1310, a LM, such as LLM, that provides context generates a list of token with their probabilities 1320. Random permutation of taken(s) with a specific key shard between the sender and the receiver is performed at 1330 to arrive at a CDF of the permuted tokens at 1340. Thus, for bit string 1011100101, converting this input stream into a rational number (0, 1) and locating it in the formed CDF is performed at 1360. The output 1370 of block 1360 shows where this particular bit string falls within the CDF of the permuted tokens.

With regard to embedding a bit stream in multiple SMS messages, in the example of ACOL encoding using ByT5 LM fine-tuned using SMS data, the generated cover text for an input bit stream is usually short and does not embed all the bit stream. In such cases the generated cover text may be sent as it is to the receiver. The receiver knows how many bits it is supposed to receive as "number of bits" is in the header of the packet. By decoding a short cover text and realizing not all the bits in the input are sent, the receiver will generate a response to the received cover text (SMS), without embedding any bits in it using the same language model.

In some examples when the input bit stream is short, the generated cover text ends in the middle of a sentence while it has embedded all the bits in the input bit stream. In such cases, the sender uses the LLM to generate the rest of the tokens such that the sentence is finished. In the receiver side, as the receiver knows how many bits it was supposed to receive, it will simply ignore the extra bits that the completed sentence cover text is conveying.

Figure 14:
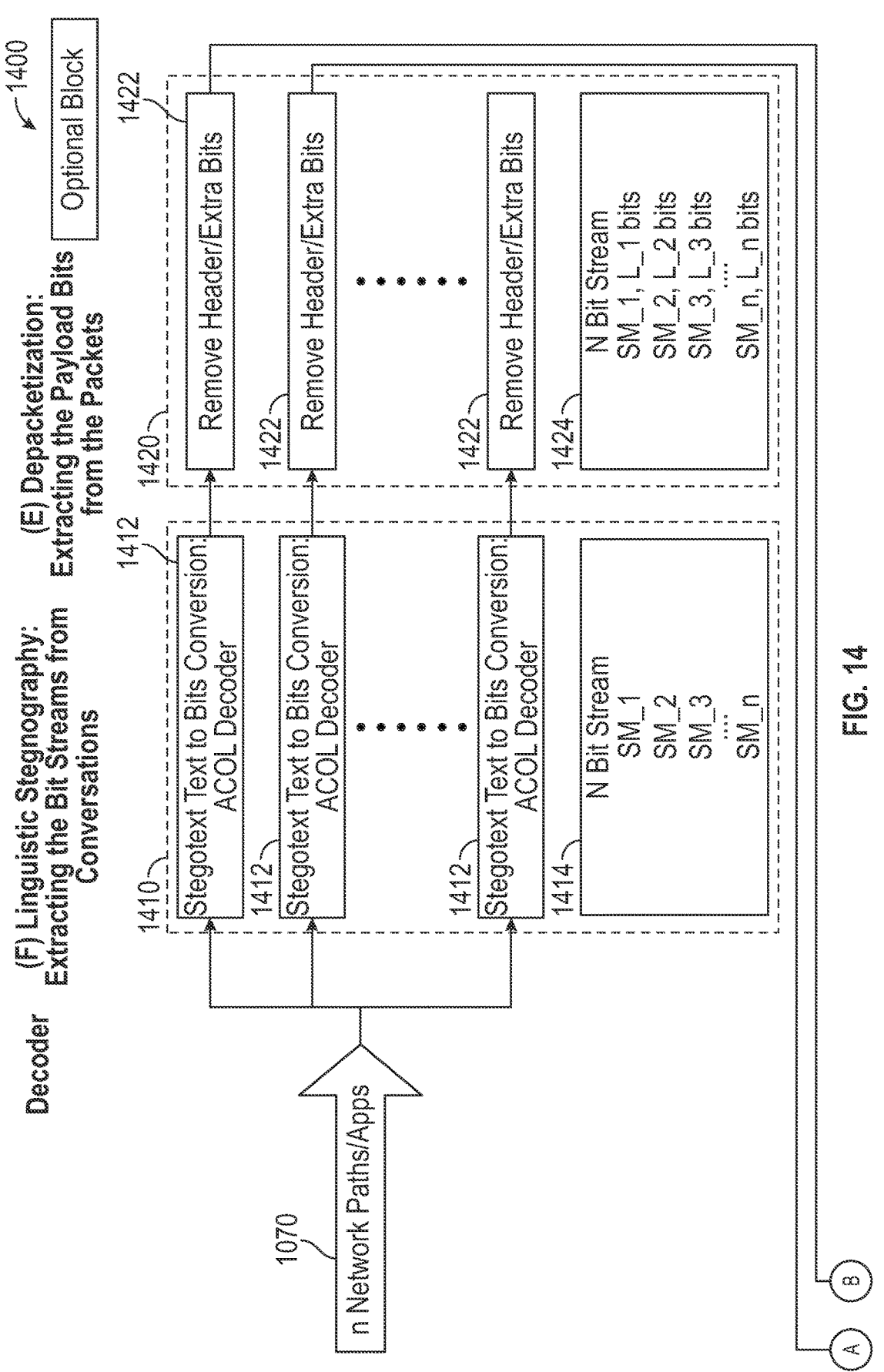
FIG. 14 illustrates content aggregation, receipt, and inversion on the receiver side, in accordance with various representative embodiments of the present disclosure.
Figure 14:
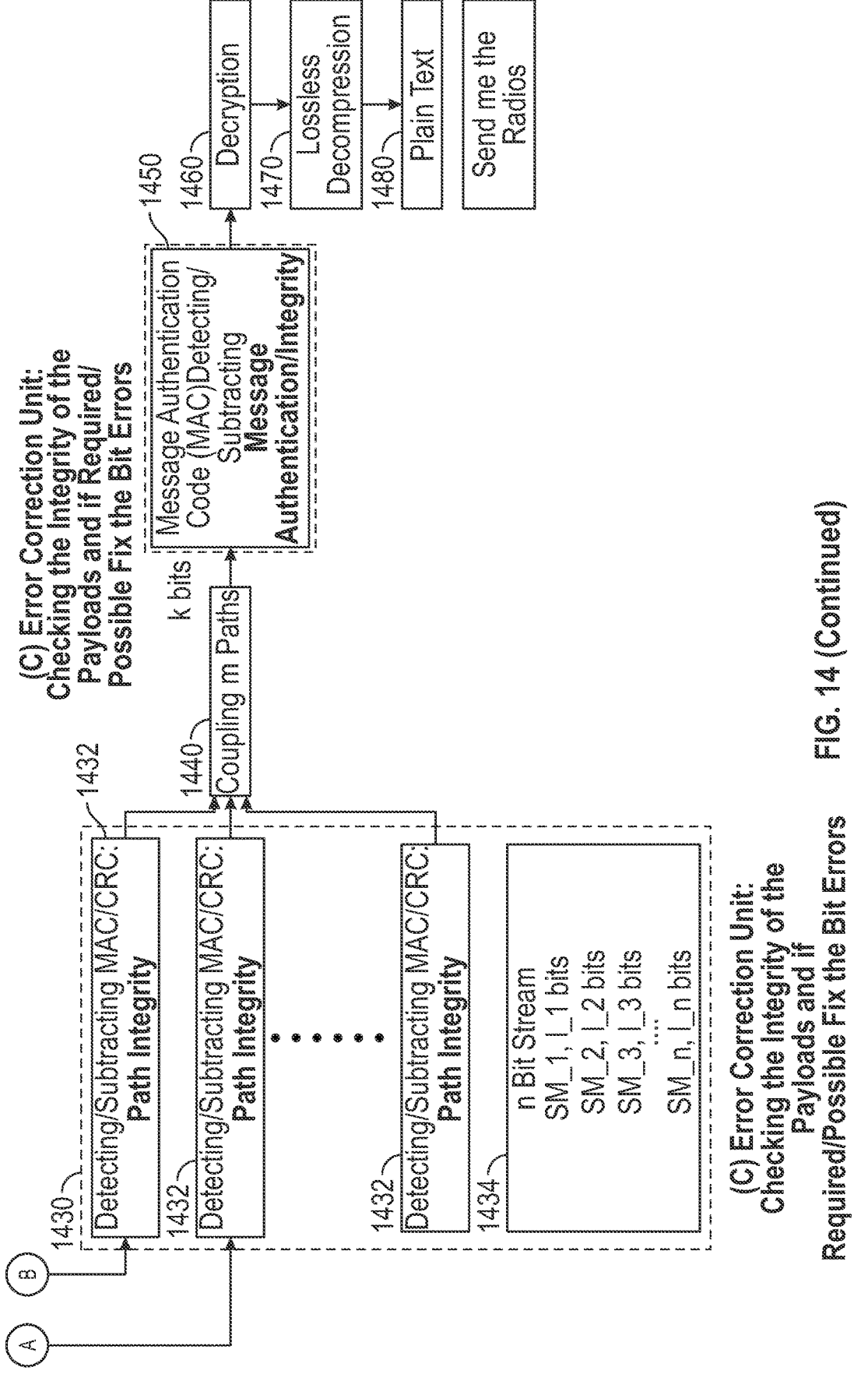

In FIG. 14, an example of the content aggregation, receipt, and inversion on the receiver side, including decryption, decoding and NLP ML function, is illustrated. In the drawing, functional blocks (C), (E), and (F), analogous to functional blocks (C), (E), and (F) of FIG. 10 but on the receiver side, are shown:

(F) Linguistic Steganography—extracting the bit streams from conversations. At blocks 1412, stegotext text to bits conversion by an ACOL decoder, for example, is performed, yielding a N Bit Stream at 1414: N Bit StreamSM_1; SM_2; SM_3; . . . ; SM_n.

(E) Forming Packets 1040—Depacketization. In block 1420 the payload bits are extracked from the packets coming in from bloc 1410. The header/extra bits are removed at 1422 resulting in a N Bit Stream SM_1, L_1 bits; SM_2, L_3 bits; SM_3, L_3 bits; . . . ; SM_n, L_n bits. Again, the example packet format 100 is shown in FIG. 11.

(C) Message Authentication. At block 1430 error correction unit, the integrity of the payloads is checked and if possible or required, bit errors are fixed. At 1432 MAC/CRC errors are detected and subtracted to ensure path integrity, resulting at 1434 in a n Bit Stream: SM_1, I_1 bits; SM_2, I_3 bits; SM_3, I_3 bits; . . . ; SM_n, I_n bits. Coupling/aggregating of the m paths occurs at 1440 to yield a bitstream of k bits. At 1450, message authentication and integrity continues, with MAC/CRC subtraction continuing.

(E) Forming Packets 1040—adding headers according to design protocol. The segments having I_1 Bits, I_2 Bits, . . . , I_n Bits from the Distributing Unit 1030 are provided to 1040 and headers added at 1042, to generate packets m_1 Bits, m_2 Bits, . . . , m_n Bits as shown. The packet format 100 is shown in FIG. 11.

(C) Message Authentication. At 1050 packets m_1 Bits, m_2 Bits, . . . , m_n Bits are provide to MAC/CRC units 1052. At 1054, RS, error-correction resilience is applied to generate CRCs 1056 to generate packets having L_1 bits, L_2 bit, . . . , L_n bits, as shown.

(F) Linguistic Steganography-extracting the bit streams from conversations. The packets having L_1 bits, L_2 bit, . . . , L_n bits from block 1050 are provided to 1060 as shown. Blocks 1062, 1064, 1066 perform Bits to stegotext conversion using an arithmetic coding (ACOL) Encoder that adds r_1 Bits, r_2 bits and r_n bits, respectively, that great n Cover Stegotext at 1068.

At block 1460 encryption is performed, followed by lossless recompression at 1470 to yield the original text message "Send me the Radios."

The messaging app described herein has the ability to generate mundane text that encrypts the ciphertext in multiple languages. The LM can be trained on the target language in order to generate the stegotext. This LM can be fine-tuned on a multi-lingual SMS/MMS dataset. In particular, a byte- or subword-level LM can greatly facilitate this adaptation since different languages often share the same or similar set of underlying characters. Alternatively, carefully crafted prompts in an in-context learning arrangement allows control of the LM's output with regards to language, dialect, geographic characteristics, etc. Still further, for high-quality LMs in which some languages are unavailable, automatic machine translation (MT) systems may be employed. In this case, stegotext is first generated and the MT system is used to translate the stegotext in the target language before broadcasting it. A MT system in the reverse direction will operate on the decoding side, which will translate the received ciphertext into the original ciphertext (i.e. before translation) for further decoding. To ensure that the original sentence is obtained following translation, such as for example in translating an English sentence into French and then back into English, MT systems are trained to codify invertibility (and transitivity) as loss functions that can be then optimized.

With regard to hiding dialog and other original content in multi-modal or mixed communications, such as text, image, audio, and/or video communications, the messaging application can support conversation that are a mixture of multiple modalities like texts, images, video and audio. Such dialogs can be encoded with the encoded results two-way mundane, stegotext conversations in a local language. For example, an encoded conversation history between the sender and the receiver is denoted as (XS,1,XR,1,XS,2,XR, 2, . . . , XS,t,XR,t), where XS,t' and XR,t' are the encoded sender and receiver utterances (i.e., stegotexts) at the t'-th turn, respectively, and each $Xt'=[xt'\ 1, xt'\ 2, . . . , xt'\ n]$ is a sequence of UTF-8 bytes when using a byte-level LM. To encode the original text that the sender would like to send in the next turn (i.e., the (t+1)-th turn in this conversation), now the LM generation will be conditioned on the conversational history, i.e., xS,t+1 n+1~Pstego (xS, t+1n+1 [U],XS, 1, [A], XR, 1, . . . , [U],XS,t, [A],XR,t, [U], xS,t+1 1, . . . , xS,t+1n), where [U] and [A] are special delimiter tokens indicating the boundary of each Utterance and Answer response, respectively. As such, the encoded stegotext from the sender (XS,t+1) will read like a coherent conversational response to the receiver. To enable this capability, an LM that has been trained to produce conversational responses is needed. To this end, a byte-level LM is trained on a conversational dataset. In two-way communications, the receiver can also send a secret message back to the sender. The encoding of the receiver text can be defined in the same way, except that the LM will be conditioned on the conversational history up to the sender utterance in the same turn (XS,t+1), i.e., xR,t+1 n+1~Pstego (xR,t+1 n+1 [U],XS, 1, [A],XR, 1, . . . , [U],XS,t, [A],XR,t, [U], XS, t+1, [A], xR,t+1 1, . . . , xR,t+1 n). In practice, the model complexity can be reduced by considering only the latest few (e.g., 2 or 3) turns in the conversational history.

Mixed or multi-modal text and image-based conversations are commonly used in MMS messages, so there is a need to hide original content in cover content in such dialogues. An end-to-end approach between sender and receiver in a conversation, text may be directly encoded in audio. Ciphertext Xc is provided by the user from which a mundane or stegotext text Xm is generated by an LM as described above, possibly conditioned on the previously generated dialog, images, etc. Features F for the desired voice that will describe characteristics like gender, age, or accent are defined. The messaging app will generate an audio sequence V where each (or some) audio frame vn will be generated according to these inputs and the previously generated audio such that vn+1~Pstego (vn+1|Xc,Xm, F, v1 . . . n).

An appeal of directly encoding text in audio is the much higher efficiency. Whereas before the number of bits that can be encoded is bounded by the number of words generated in the mundane message and even a small number of words that would amount to a few seconds of speech corresponds to thousands of audio samples that need to be generated. Using the direct encoding approach, orders of magnitude more information may be encoded in a single audio stream corresponding to the same small number of words.

In addition to text-based input, direct audio-based input is supported. The sender/user chooses whether to provide, and send, a voice message. The user can choose whether they want the receiver to decode the transmitted message also in audio format, or if they will simply provide the message in text without audio. In that latter setting, we a Speech-to-Text (STT) component may be incorporated in the encoder side, which will transcribe the audio message before proceeding with the above-outlined steganography approach. From an efficiency point of view, this setting is the most beneficial, since the text transcription is a very efficient, human-friendly compression of the audio utterance. Consider as an example that 1 second of audio might require 16,000 floating point numbers to capture, but it can be compressed in up to 10-20 characters. That said, the sender/user may in fact want to relay a message including the characteristics of the audio— the additional "para-linguistic" information encoded in such a message can be extremely valuable, e.g. by conveying the emotional state of the speaker. Hence, direct voice steganography is also supported. An audio-in-audio steganography approach will follow an approach similar to above and have the following inputs: the cipher-audio Vc (provided by the user), and a mundane text Xm (generated by an LM as described above, possibly conditioned on the previously generated dialog, images, etc). Now LMI will generate an audio sequence V where each (or some) audio frame vn will be generated according to these inputs (and the previously generated audio) such that vn+1~Pstego (vn+1|Vc,Xm, v1 . . . n).

With regard to live calls, i.e. real-time conversations, the amount of information needed to represent audio is quite large. A single second of audio may be 16,000 samples (i.e. numbers). Hence, encoding long utterances would require mundane messages that will be thousands of words long. This efficiency challenge may be addressed in two ways. First, the voice is transcribed from voice Vc to text Xc and converted back to voice at the receiver. To avoid losing information about the speaker's voice, a sample of the speaker's voice is additionally encoded to function as a template on the receiver side. The app on the receiver side may use a TTS system (as above) to recreate the voice message based on the decoded sample and stegotext. Of course, an issue with this approach is that information about the message's tone, pauses may be lost. An alternative approach is to compress the voice first into a relative low-quality signal (with small sample rate) that is then hidden/encoded into an HD voice signal. The orders-of-magnitude difference in samples between the two audio files should resolve the efficiency issue outlined above. Then at the receiver side, the HD stego-audio can be reversed/decoded to recover the original cipher-audio. While the result might maintain the quality of the original signal, all key features should still be recognizable.

For multi-modal communications, conversion efficiency for texts may be measured in bits/word, i.e. how many cipher bits can be encoded in each word of the stegotext; for imagines, efficiency may be measured in bits/pixel, i.e. how many cipher bits can be encoded in one pixel of the stego image, etc.

Network Traffic Profile Obfuscation

An adversary can also monitor and analyze the traffic to learn the behavior of a user or infer its identity. Although steganography can hide the existence of secret communication, it cannot hide the communication metadata. Therefore, the generated content also needs to be robust against a network pattern-of-life analysis. Fortunately, generative AI-based steganography techniques are used to generate dummy dialog to confuse an eavesdropper. The messaging app described herein enables an application layer-based network traffic obfuscation mechanism that is robust against deep packet inspection. That is, even if an attacker collects all the packets and decodes the data, all that will be seen is the stegotext with meanings. Generating meaningful application layer stego contents for network pattern-of-life is more efficient than generating dummy network traffic at the network layer and packet level since fine-grained knowledge of the individual user application behavior can be leveraged.

The cover stegotexts generated should appear like ordinary, mundane messages that would not arouse suspicion from an adversary or other party. In addition to obfuscating the content of mission-critical messages, in accordance with the present disclosure, the traffic of a user can also be obfuscated to avoid detection by an adversary who could perform traffic analysis to discover anomalous patterns and classify network pattern-of-life (POL) profiles. Detection of such patterns could trigger further actions by the adversary such as localization of the source of an anomalous traffic profile. Thus, traffic profile obfuscation can address this problem. A unique aspect of traffic obfuscation is that it is performed at the application-level. In contrast to more conventional network-based traffic obfuscation, the messaging app traffic obfuscation described herein will be able to thwart adversaries who are capable of performing deep packet inspection.

Therefore, traffic profile obfuscation characterizes the wireless network by a mundane POL profile or multiple POL profiles. A POL analysis module will play the role of an adversary performing traffic profile analysis in the network. This could be achieved by a device or a set of devices placed in the network that passively collect data from the wireless network. The PoL analysis module will apply AI/ML classifiers to determine a set of common traffic profiles in the network, Similar to the local language context and model for a given geographic region, a suitable PoL traffic profile model will be downloaded to each sender or receiver device. Various network performance metrics could be used to characterize a POL profile. For example, four different metrics were proposed to define a POL for the purpose of enhancing an IDS. Consider that the time-of-day for a 24-hour day is divided into four time periods and a weekday is distinguished from a weekend. Useful performance metrics for the application could include, for example: 1) average throughput; 2) peak rate; 3) maximum burst size; and 4) average burst size. Thresholds can be defined for each of these metrics that would represent the maximum expected network usage at a given time-of-day.

Further, for a traffic Pattern-of-Life Synthesis Module for a given local POL model, a sender device can ensure that the traffic it generates conforms to this model as closely as possible in order to avoid detection by an adversary, in a POL synthesis. The local POL model could be updated on the sender or receiver device periodically in a manner similar to updates to the language context and model. To perform POL synthesis, the device tracks the traffic leaving its network interfaces.

Using AI generative methods, the application can inject "dummy" traffic to synthesize an artificial POL profile that closely approximates the downloaded local model. The purpose of the "dummy" traffic is to enable the device to "hide in the crowd" with respect to its network PoL. These dummy messages do not carry any mission-critical data. The app will generate dummy messages at certain times of the day in conformity with its overall profile with respect to texting traffic. The app will initiate the generation of traffic via multiple indigenous apps in conjunction with the multi-app and multi-interface modules discussed above.

In keeping with various embodiments, the messaging app may be operated in several different modes, depending on how much control the user of a device that is running the messaging app wants.

In the simplest mode for text messaging, the user would only see its original input text and the decoded text. Operation in this mode would be much like using a simple SMS/MMS messaging app. The user would be unaware of the stegotexts generated by messaging app or the app-channels and network interfaces used by the messaging app for transmission. The underlying messaging app software would automatically optimize the configuration of the app according to a set of default parameter settings. A more savvy user might want to see the generated cover text and have control over whether the cover text will be transmitted. Such a user may also wish to control which indigenous apps and network interfaces are used for data transmission, which would require a different mode of operation. The user interface (UI) of the messaging app will allow the user to easily switch between different operational modes, in consideration of how much control is to be given to the user and how much of the underlying operational parameters are to be revealed to the user.

Figure 15:
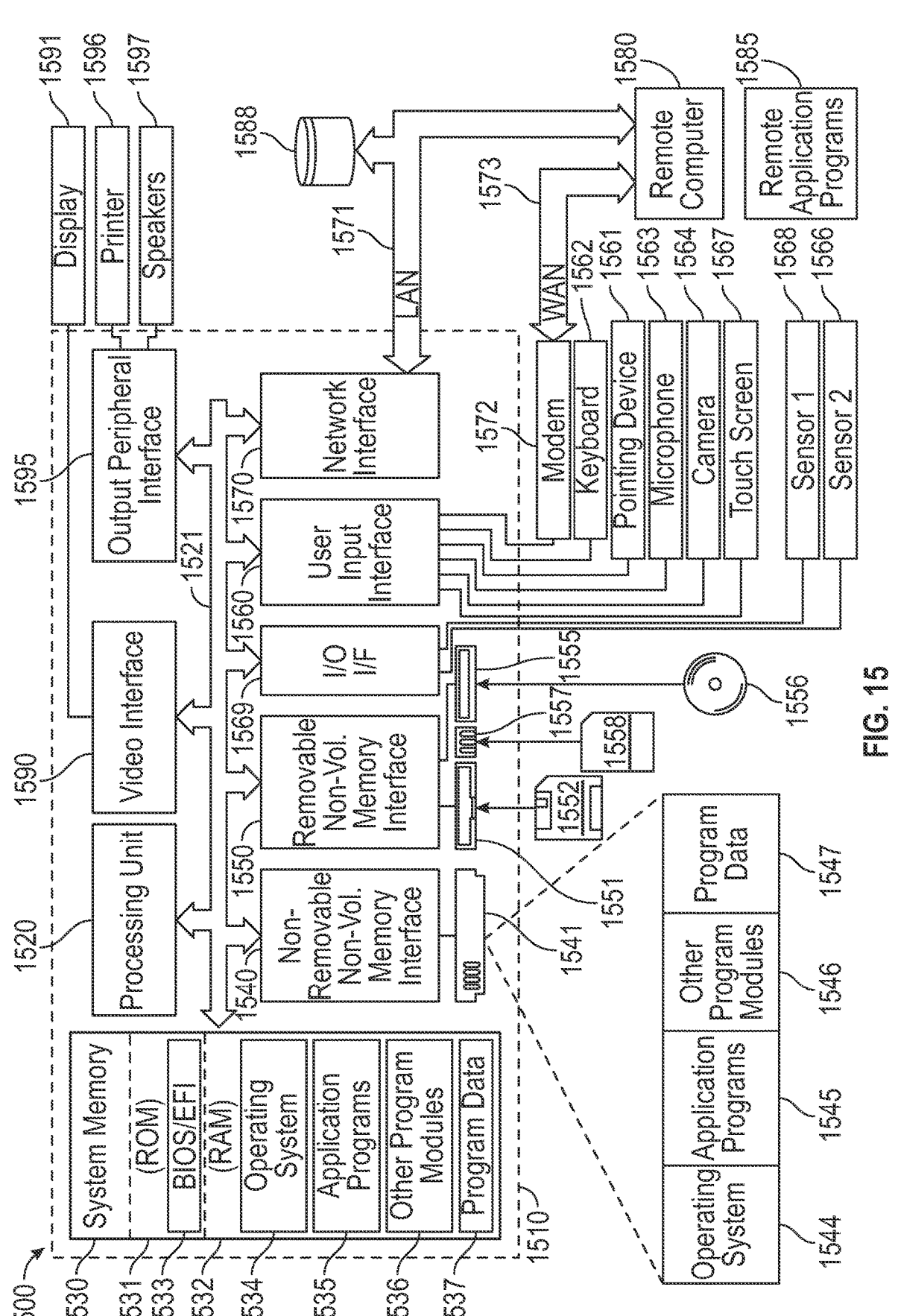
FIG. 15 illustrates an example controller and/or computing environment in which aspects of some of the embodiments of the present disclosure may be implemented, in accordance with embodiments of the present disclosure.

FIG. 15 illustrates an example controller and/or computing environment on which aspects of some embodiments may be implemented. The computing environment 1500 is only one example of a computing environment and is not intended to suggest any limitation as to the scope of use or functionality of the claimed subject matter. Neither should the computing environment 1500 be interpreted as having any dependency or requirement relating to any one or combination of components illustrated in the example operating environment 1500.

Embodiments are operational with numerous other general purpose or special purpose computing system environments or configurations. Examples of well-known computing systems, environments, and/or configurations that may be suitable for use with various embodiments include, but are not limited to, embedded computing systems, personal computers, server computers, mobile devices, hand-held or laptop devices, multiprocessor systems, microprocessor-based systems, set top boxes, programmable consumer electronics, medical device, network PCs, minicomputers, mainframe computers, cloud services, telephonic systems, distributed computing environments that include any of the above systems or devices, and the like.

Embodiments may be described in the general context of computer executable instructions, such as program modules, being executed by computing capable devices. Generally, program modules include routines, programs, objects, components, data structures, etc. that perform particular tasks or implement particular abstract data types. Some embodiments may be designed to be practiced in distributed computing environments where tasks are performed by remote processing devices that are linked through a communications network. In a distributed computing environment, program modules may be located in both local and remote computer storage media including memory storage devices.

With reference to FIG. 15, an example structure and apparatus for implementing some embodiments includes a computing device 1510. Components of computing device 1510 may include, but are not limited to, a processing unit 1520, a system memory 1530, and a system bus 1521 that couples various system components including the system memory to the processing unit 1520. As described herein the computing device may be a sending device, a receiver device, or other user equipment (UE) such as a radio, a smart phone, a cell phone, a transceiver, etc. or any equipment capable of sending and/or receiving messages using an app in an application layer over multiple channels of a communications network.

Computing device 1510 may include a variety of computer readable media. Computer readable media may be any available media that can be accessed by computing device 1510 and includes both volatile and nonvolatile media, and removable and non-removable media. By way of example, and not limitation, computer readable media may include computer storage media and communication media. Computer storage media may include volatile and/or nonvolatile, and/or removable and/or non-removable media implemented in any method or technology for storage of information such as computer readable instructions, data structures, program modules or other data. Computer storage media includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing device 1510.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media configured to communicate modulated data signal(s). Combinations of any of the above should also be included within the scope of computer readable media.

System memory 1530 includes computer storage media in the form of volatile and/or nonvolatile memory such as ROM 1531 and RAM 1532. A basic input/output system 1533 (BIOS), containing the basic routines that help to transfer information between elements within computing device 1510, such as during start-up, is typically stored in ROM 1531. RAM 1532 typically contains data and/or program modules that are immediately accessible to and/or presently being operated on by processing unit 1520. By way of example, and not limitation, FIG. 15 illustrates operating system 1534, application programs 1535, other program modules 1536, and program data 1537 that may be stored in RAM 1532.

Computing device 1510 may also include other removable/non-removable volatile/nonvolatile computer storage media. By way of example only, FIG. 15 illustrates a hard disk drive 1541 that reads from or writes to non-removable, nonvolatile magnetic media, a magnetic disk drive 1551 that reads from or writes to a removable, nonvolatile magnetic disk 1552, a flash drive reader 1557 that reads flash drive 1558, and an optical disk drive 1555 that reads from or writes to a removable, nonvolatile optical disk 1556 such as a Compact Disc Read Only Memory (CD ROM), Digital Versatile Disc (DVD), Blue-ray Disc™ (BD) or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1541 is typically connected to the system bus 1521 through a non-removable memory interface such as interface 1540, and magnetic disk drive 1551 and optical disk drive 1555 are typically connected to the system bus 1521 by a removable memory interface, such as interface 1550.

The drives and their associated computer storage media discussed above and illustrated in FIG. 15 provide storage of computer readable instructions, data structures, program modules and other data for computing device 1510. In FIG. 15, for example, hard disk drive 1541 is illustrated as storing operating system 1544, application programs 1545, program data 1547, and other program modules 1546. Additionally, for example, nonvolatile memory may include instructions, for example, to discover and configure IT device(s); to create device neutral user interface command(s); combinations thereof, and/or the like.

A user may enter commands and information into computing device 1510 through input devices such as a keyboard 1562, a microphone 1563, a camera 1564, touch screen 1567, and a pointing device 1561, such as a mouse, trackball or touch pad. These and other input devices are often connected to the processing unit 1520 through a user input interface 1560 that is coupled to the system bus, but may be connected by other interface and bus structures, such as a parallel port, a game port and/or a universal serial bus (USB).

Sensors, such as sensor 1 1568 and sensor 2 1566, may be connected to the system bus 1521 via an Input/Output Interface (I/O I/F) 1569. Examples of sensor(s) 1566, 1568 include a microphone, an accelerometer, an inertial navigation unit, a piezoelectric crystal, and/or the like. A monitor 1591 or other type of display device may also be connected to the system bus 1521 via an interface, such as a video interface 1590. Other devices, such as, for example, speakers 1597 and printer 1596 may be connected to the system via peripheral interface 1595.

Computing device 1510 may be operated in a networked environment using logical connections to one or more remote computers, such as a remote computer 1580. The remote computer 1580 may be a personal computer, a mobile device, a hand-held device, a server, a router, a network PC, a medical device, a peer device or other common network node, and typically includes many or all of the elements described above relative to computing device 1510. The logical connections depicted in FIG. 15 include a local area network (LAN) 1571 and a wide area network (WAN) 1573, but may also include other networks such as, for example, a cellular network. Such networking environments are commonplace in offices, enterprise-wide computer networks, intranets and the Internet.

When used in a LAN networking environment, computing device 1510 may be connected to the LAN 1571 through a network interface or adapter 1570. When used in a WAN networking environment, computing device 1510 typically includes a modem 1572 or other means for establishing communications over the WAN 1573, such as the Internet. The modem 1572, which may be internal or external, may be connected to the system bus 1521 via the user input interface 1560, or other appropriate mechanism. The modem 1572 may be wired or wireless. Examples of wireless devices may include, but are limited to: Wi-Fi, Near-field Communication (NFC) and Bluetooth™. In a networked environment, program modules depicted relative to computing device 1510, or portions thereof, may be stored in the remote memory storage device 1588. By way of example, and not limitation, FIG. 15 illustrates remote application programs 1585 as residing on remote computer 1580. It will be appreciated that the network connections shown are exemplary and other means of establishing a communications link between the computers may be used. Additionally, for example, LAN 1571 and WAN 1573 may provide a network interface to communicate with other distributed infrastructure management device(s); with IT device(s); with users remotely accessing the User Input Interface 1560; combinations thereof, and/or the like.

As described herein, defense, security and military personnel and service teams who are deployed overseas and need to use indigenous 5G/cellular networks for daily communication may be concerned about their communications being intercepted/blocked and their identities being inferred by adversaries. Such communities benefit from covert and resilient communications in non-cooperative networks. Further, non-military people such as NGO (non-governmental organization) personnel, humanitarian aid workers, journalists, and U.S. foreign service members, including those who are working overseas, benefit. Security and privacy requirements may be adjusted as needed. Usually, for military communication, military standard encryption and message authentication will be applied, such as 256-AES (advanced encryption standard), Secure Hash Standard (SHS), and Elliptic Curve Cryptography (ECC) are contemplated. While for civilian use, weaker encryption in order run on consumer grade smartphones strikes a good balance between security strength, energy consumption, real-time performance, and hardware requirements.

The following embodiments are combinable.

Therefore, in one embodiment of the disclosure an example method includes at a sender side of a network communication between a sender and a receiver in a communication network: converting, via a language model, an original content in a source language into a cover content in a target language, where the target language is decoupled from the original content and has a context that corresponds to the network communication; and transmitting, using one or more applications in an application layer of the communication network, the cover content to the receiver in the target language across one or more communication channels of the communication network.

In another embodiment of the method, converting the original content into the cover content includes: encrypting the original content into a ciphertext; and the language model encoding the ciphertext into a stegotext in the target language.

In another embodiment of the method, the ciphertext is a random bit string.

In another embodiment of the method, encrypting is performed using a shared secret key shared between the sender and the receiver.

In another embodiment of the method, the language model encoding the ciphertext by controlling how a next token is chosen at recurrent steps including choosing the next token to be sampled based on a probability distribution determined by the language model and the ciphertext.

In another embodiment of the method, the language model is a byte-level language model or a subword language model that generates a byte in each recurrent step.

In another embodiment of the method, the context of the stegotext generated by the language model being coherent to one or more of operational context and dialog context.

In another embodiment of the method, prior to transmitting the cover content in the target language to the receiver, further including an automatic machine translation (MT) system translating the stegotext into the target language.

In another embodiment of the method, the language model applying chatbots to randomly generate the context of the cover content, the cover content having randomized frequency and time characteristics.

In another embodiment of the method, the user profiles of the sender and receiver of the network communication and metadata of the network communication are obfuscated by the chatbots.

In another embodiment of the method, the language model is trained on the target language.

In another embodiment of the method, the language model is a byte-level language model or a subword language model that generates a byte in each recurrent step.

In another embodiment of the method, the target language is relevant to a location of one or more of the sender and the receiver.

In another embodiment of the method, the language model converting the original content into the cover content in the target language includes the language model generating one or more portions of a multi-modal cover content.

In another embodiment of the method, the one or more portions of the multi-modal cover content include one or more of text, audio, image and voice.

In another embodiment of the method, the language model converting the original content into multi-modal cover content having text and audio responsive to receiving a ciphertext encrypted from the original content and one or more characteristics for an audio portion of the multi-modal cover content, the text and the audio of the multi-modal cover content measured in bits.

In another embodiment of the method, the original content is a voice message and prior to converting the original content into the cover content, the voice message is transcribed to a text message.

In another embodiment of the method, prior to transmitting the cover content in the target language to the receiver, further including generating messages of the cover content and transmitting the messages of the cover content to the receiver by distributing the messages across communication channels using the one or more applications.

In another embodiment of the method, further including at a receiver side of the network communication: inverting the received cover content to retrieve the original content.

In another embodiment of the method, inverting the received cover content to retrieve the original content includes the language model decoding the stegotext of the received cover content into encrypted ciphertext and decrypting the encrypted ciphertext to retrieve the original content.

In another embodiment of the method, further including at the receiver side of the network communication the language model: extracting one or more bit chunks of the ciphertext; tracking a conditional probability distribution of each bit chunk in each recurrent step; and deriving an encoded bit chunk based on the probability score of the token in the stegotext.

In another embodiment of the method, the network communication is a network conversation between the sender and the receiver and responsive to the receiver receiving the cover content, further including at the receiver side of the network conversation: generating using the language model reply cover content in the target language, where the reply cover content is decoupled from the original content and has a context responsive to the cover content received from the sender in the target language of the network conversation; and transmitting to the sender the reply cover content across one or more communication channels of the communication network using the one or more applications.

In another embodiment of the method, converting the original content into the cover content includes: the language model converting the original message intended for the receiver into context-relevant messages in the target language, the context-relevant messages decoupled from the original message and having a context that corresponds to the network communication in the target language; and where transmitting to the receiver the cover content in the target language across one or more communication channels of the communication network includes: transmitting using the one or more applications in the application layer of the communication network to the receiver the context-relevant messages in the target language across one or more communication channels of the communication network.

In another embodiment of the method, responsive to receiving the context-relevant messages generated by the sender, language model further generating one or more reply context-relevant messages responsive to the context-relevant messages and distributing the one or more reply context-relevant messages using the one or more application across the communication channels and where the context-relevant messages and the one or more reply context-relevant messages form a network conversation between the sender and the receiver.

In another embodiment of the method, responsive to receiving a context-relevant message of the context-relevant messages in an application of the one or more applications over a communication channel, the language model generating a reply context-relevant message that is within a context of the context-relevant message and distributing the generated reply context-relevant message to the sender over the communication channel using the application.

In another embodiment of the method, a language model used by the receiver device uses natural language processing (NLP) to generate the one or more reply context-relevant messages.

In another embodiment of the method, the language model is a randomized language model.

In another embodiment of the method, the source language of the original content and the target language of the cover content are the same language.

Therefore, in one embodiment of the disclosure a further method includes at a sender side of a network communication between a sender and a receiver in communication network: encoding a ciphertext into a stegotext in a target language using a randomized language model, the ciphertext based upon an original content in a source language, the stegotext randomly generated by the language model to be decoupled from the original content and to have an assigned context in the target language that corresponds to the network communication in the target language; and transmitting the stegotext to a receiver over multiple communication channels of a communication network using one or more applications on an application layer of the communication network.

In another embodiment of the method, prior to transmitting the stegotext to the receiver, further including: generating messages of the stegotext and transmitting the messages of the stegotext to the receiver by distributing the messages across communication channels using the one or more applications.

In another embodiment of the method, prior to transmitting the stegotext to the receiver, further including an automatic machine translation (MT) system translating the stegotext into the target language.

In another embodiment of the method, further including at a receiver side of the network communication: inverting the received stegotext to retrieve the original content.

In another embodiment of the method, inverting the received stegotext to retrieve the original content including the language model decoding the received stegotext into encrypted ciphertext and decrypting the encrypted ciphertext to retrieve the original content.

In another embodiment of the method, further including the language model at the receiver side of the network communication: extracting one or more bit chunks of the encrypted ciphertext; tracking a conditional probability distribution of each bit chunk in each recurrent step; and deriving an encoded bit chunk based on the probability score of the token in the stegotext.

In another embodiment of the method, the network communication is a network conversation between the sender and the receiver and responsive to the receiver receiving the stegotext, further including at the receiver side of the network conversation: generating using the language model reply stegotext in the target language, where the reply stegotext is decoupled from the original content and has a context responsive to the stegotext received from the sender in the target language of the network conversation; and transmitting to the sender the reply stegotext across one or more communication channels of the communication network using the one or more applications.

In another embodiment of the method, the randomized language model converting the ciphertext into the stegotext in the target language includes the randomized language model generating one or more portions of a multi-modal stegotext.

In another embodiment of the method, the one or more portions of the multi-modal stegotext include one or more of text, audio, image and voice.

In another embodiment of the method, the randomized language model converting the original content into multi-modal cover content having text and audio responsive to receiving a ciphertext encrypted from the original content and one or more characteristics for an audio portion of the multi-modal stegotext, the text and the audio of the multi-modal stegotext measured in bits.

In another embodiment of the method, the original content is a voice message and prior to encoding the ciphertext into the stegotext, transcribing the voice message to a text message.

In another embodiment of the method, the ciphertext generated by encrypting the original content into a random bit string.

In another embodiment of the method, further including encrypting the original content into the random bit string using a secret key shared by the sender and the receiver.

In another embodiment of the method, the shared secret key is established by a key exchange protocol based on a public key certificate.

In another embodiment of the method, the encoding is byte-level encoding.

In another embodiment of the method, the source language of the original content and the target language of the stegotext are the same language.

In another embodiment of the method, encoding the ciphertext, via the language model, by controlling how a next token is chosen at recurrent steps further including choosing the next token to be sampled based on a probability distribution determined by the language model and the ciphertext.

In another embodiment of the method, the language model is a byte-level language model or a subword language model that generates a byte in each recurrent step.

In another embodiment of the method, the context of the stegotext generated by the language model being coherent to one or more of operational context and dialog context.

In another embodiment of the method, the language model applying chatbots to randomly generate the context of the stegotext, the stegotext having randomized frequency and time characteristics.

In another embodiment of the method, the user profiles of the sender and receiver of the network communication and metadata of the network communication are obfuscated by the chatbots.

Therefore, in one embodiment of the disclosure, an example system includes communication channels in a communication network configured to support applications in an application layer of the communication network; a sender device of the system coupled to the communication channels in the communication network and configured to distribute a cover content intended for a receiver in a network communication using one or more applications across communication channels, where the cover content is decoupled from an original content in a source language and embedded within the cover content and has a context that corresponds to the network communication in a target language, with the cover content generated by a language model; and a receiver device of the system coupled to the communication channels in the communication network and configured to receive the cover content over the communication channels in the communication network, the language model configured to recover the original content from the received cover content.

In another embodiment of the system, the language model is coupled to a network edge service, server or device at a network edge of the communication network.

In another embodiment of the system, the language model converts the original content into the cover content and the network edge service, server or device provides the cover content to the sender device.

In another embodiment of the system, the language model recovers the original content embedded in the cover content and the network edge service, server or device provides the original content to the receiver device.

In another embodiment of the system, one or more of the sender device uses the language model to convert the original content into the cover content and the receiver device is further configured to use the language model to invert the cover content to recover the original content embedded in the cover content.

In another embodiment of the system, the sender device is configured to process the original content to generate a ciphertext and convert the ciphertext into the cover content using the language model.

In another embodiment of the system, the sender device is configured to encrypt the original content using a security key to generate the ciphertext and to convert the ciphertext into the cover content using the language model to encode the ciphertext into a stegotext.

In another embodiment of the system, the language model is configured to encode the ciphertext by controlling how a next token is chosen at recurrent steps where the next token to be sampled is chosen based on a probability distribution determined by the language model and the ciphertext.

In another embodiment of the system, the language model is a byte-level language model or a subword language model that generates a byte in each recurrent step.

In another embodiment of the system, the receiver device is configured to decrypt the ciphertext using the security key.

In another embodiment of the system, the security key is a shared security key used by the sender and receiver devices.

In another embodiment of the system, the shared secret key is established by a key exchange protocol based on a public key certificate.

In another embodiment of the system, the receiver device uses the language model to invert the cover content into ciphertext and the receiver device is further configured to decrypt and decode the ciphertext to the original content.

In another embodiment of the system, the receiver device is configured to use the language model to extract one or more bit chunks of the encrypted ciphertext; track a conditional probability distribution of each bit chunk in each recurrent step; and derive an encoded bit chunk based on the probability score of the token in the stegotext.

In another embodiment of the system, the ciphertext is a random bit string.

In another embodiment of the system, responsive to receipt of the cover content generated by the sender device, the receiver device is further configured to generate using the language model reply cover content and distribute the reply cover content using the one or more applications across the communication channels, where the cover content and the reply cover content form a network conversation between the sender device and the receiver device and where the cover content and the reply cover content share a cover context determined by the language model.

In another embodiment of the system, the cover content and the reply cover content are generated in the target language.

In another embodiment of the system, the target language is relevant to a location of one or more of the sender device and the receiver device.

In another embodiment of the system, responsive to receipt by the receiver device of a cover content message in an application of the one or more applications over a communication channel, the receiver device is further configured to use the language model to generate a reply cover content message and distribute the generated reply cover content message to the sender device over the communication channel using the application, where the cover content message and the reply cover content message share the cover context and are decoupled from the original content.

In another embodiment of the system, language model used by the receiver device uses natural language processing (NLP) to generate the reply cover content.

In another embodiment of the system, the cover content and the reply cover content are generated in the target language.

In another embodiment of the system, the language model is stored on the sender device and on the receiver device.

In another embodiment of the system, the plurality of communication channels include one or more of cellular, Wi-Fi, satellite.

In another embodiment of the system, the language model uses natural language processing (NPL) to generate the cover content.

In another embodiment of the system, the one or more applications include one or more of short messaging service/multimedia messaging service (SMS/MMS), voice, email and messaging applications operating on one or more application layers of the communication network.

In another embodiment of the system, the original content includes one or more of text, audio, video, image, voice and multiple-modal communications and the cover content includes or more of text, audio, video, image, voice and multiple-modal communications.

In another embodiment of the system, the language model converts the original content into the cover content in the target language by generating one or more portions of a multi-modal cover content.

In another embodiment of the system, the language model converts the original content into multi-modal cover content having text and audio responsive to receiving a ciphertext encrypted from the original content and one or more characteristics for an audio portion of the multi-modal cover content, the text and the audio of the multi-modal cover content measured in bits.

In another embodiment of the system, the original content is a voice message and prior to converting the original content into the cover content, the voice message is transcribed to a text message.

In another embodiment of the system, the language model uses natural language processing (NPL) to generate the cover content.

In another embodiment of the system, the language model is a byte-level language model or a subword language model.

Therefore, in one embodiment of the disclosure, a further system includes communication channels in a communication network configured to support applications in an application layer of the communication network; a sender device of the system coupled to the communication channels in the communication network and configured to convert an original message in a source language intended for a receiver device into context-relevant messages and distribute the context-relevant messages in a network communication using one or more applications across the communication channels, where the context-relevant messages are generated by the sender device using a language model and are decoupled from the original message and have a context that corresponds to the network communication in a target language; and a receiver device of the system coupled to the communication channels in the communication network and configured to receive the context-relevant messages over the communication channels in the communication network and invert the context-relevant messages using the language model to recover the original message from the context-relevant messages.

In another embodiment of the system, the plurality of context-relevant messages are generated in a target language.

In another embodiment of the system, the target language is relevant to a location of one or more of the sender device and the receiver device.

In another embodiment of the system, the language model is trained on the target language.

In another embodiment of the system, the sender device is configured to process the original message to generate a ciphertext and convert the ciphertext into the plurality of context-relevant messages using the language model.

In another embodiment of the system, the sender device is configured to encrypt the original message using a security key to generate the ciphertext and to convert the ciphertext into the plurality of context-relevant messages using the language model to encode the ciphertext into a stegotext.

In another embodiment of the system, the language model is configured to encode the ciphertext by controlling how a next token is chosen at recurrent steps where the next token to be sampled is chosen based on a probability distribution determined by the language model and the ciphertext.

In another embodiment of the system, the language model is a byte-level language model or a subword language model that generates a byte in each recurrent step.

In another embodiment of the system, the receiver device is configured to decrypt the ciphertext using the security key.

In another embodiment of the system, the security key is a shared security key used by the sender and receiver devices.

In another embodiment of the system, the shared secret key is established by a key exchange protocol based on a public key certificate.

In another embodiment of the system, the receiver device uses the language model to invert the plurality of context-relevant messages into the ciphertext and the receiver device is further configured to decrypt and decode the ciphertext and decode the ciphertext to the original message.

In another embodiment of the system, the receiver device is configured to use the language model to decode the stegotext of the received cover content into encrypted ciphertext; and decrypt the encrypted ciphertext to retrieve the original content.

In another embodiment of the system, the receiver device is configured to extract one or more bit chunks of the ciphertext; track a conditional probability distribution of each bit chunk in each recurrent step; and derive an encoded bit chunk based on the probability score of the token in the stegotext.

In another embodiment of the system, the ciphertext is a random bit string.

In another embodiment of the system, the language model uses natural language processing (NPL) to generate the plurality of context relevant messages.

In another embodiment of the system, the language model is a byte-level language model or a subword language model.

In another embodiment of the system, responsive to receipt of the plurality of context-relevant messages generated by the sender device, the receiver device is further configured to generate using the language model one or more reply context-relevant messages responsive to the plurality of context-relevant messages and distribute the one or more reply context-relevant messages using the one or more application across the plurality of communication channels and where the plurality of context-relevant messages and the one or more reply context-relevant messages form a network conversation between the sender device and the receiver device.

In another embodiment of the system, the plurality of context-relevant messages and the one or more reply context-relevant messages are generated in a target language.

In another embodiment of the system, the target language is relevant to a location of one or more of the sender device and the receiver device.

In another embodiment of the system, responsive to receipt by the receiver device of a context-relevant message of the plurality of context-relevant messages in an application of the one or more applications over a communication channel of the plurality of communication channels, the receiver device is further configured to use the language model to generate a reply context-relevant message that is within a context of the context-relevant message and distribute the generated reply context-relevant message to the sender device over the communication channel using the application.

In another embodiment of the system, language model used by the receiver device uses natural language processing (NPL) to generate the one or more reply context-relevant messages.

In another embodiment of the system, the language model is stored on the sender device and on the receiver device.

In another embodiment of the system, the plurality of communication channels include one or more of cellular, Wi-Fi, satellite.

In another embodiment of the system, the one or more applications include one or more of short messaging service/multimedia messaging service (SMS/MMS), voice, email and messaging applications operating on one or more application layers of the communication network.

In another embodiment of the system, the original message includes one or more of text, audio, video, image, voice, multiple-modal communications and the plurality of context-relevant messages includes or more of text, audio, video, image, voice, multiple-modal communications.

In another embodiment of the system, the language model converts the original message into the plurality of context-relevant messages in the target language by generating one or more multi-modal context-relevant messages.

In another embodiment of the system, the language model converts the original message into one or more multi-modal context-relevant messages having text and audio responsive to receiving a ciphertext encrypted from the original message and one or more characteristics for an audio portion of the one or more multi-modal context-relevant messages, the text and the audio of the one or more multi-modal context-relevant messages measured in bits.

In another embodiment of the system, the original message is a voice message and prior to converting the original message into the one or more multi-modal context-relevant messages, the voice message is transcribed to a text message.

In another embodiment of the system, the source language of the original message and the target language of the plurality of context-relevant messages are the same language.

Therefore, in one embodiment of the disclosure, an example transceiver includes a transmitter configured to transmit cover content intended for a receiver device in a communication network over communication channels in the communication network using one or more applications in an application layer of the communication network, where the cover content is decoupled from an original content in a source language and embedded within the cover content and where the cover content has a context that corresponds to a network communication in a target language; and a receiver configured to receive transmitted cover content over the communication channels in the communication network using the one or more applications in the application layer of the communication network, where a language model coupled to the receiver is configured to recover a transmitted original content embedded in the transmitted cover content received by the receiver.

In another embodiment of the transceiver, the language model is coupled to the sender device and configured to convert the original content intended for the receiver device into the cover content.

In another embodiment of the transceiver, the receiver is further configured to generate using the language model reply cover content and distribute the reply cover content using the one or more applications across the plurality of communication channels, where the cover content and the reply cover content form a network conversation between the transceiver and the receiver device and where the cover content and the reply cover content share a cover context determined by the language model that is decouple from the original content.

In another embodiment of the transceiver, the language model is configured to invert the cover content into ciphertext and the receiver is further configured to decrypt and decode the ciphertext to the original content.

In another embodiment of the transceiver, the receiver is configured to use the language model to extract one or more bit chunks of the encrypted ciphertext; track a conditional probability distribution of each bit chunk in each recurrent step; and derive an encoded bit chunk based on the probability score of the token in the stegotext.

In another embodiment of the transceiver, the ciphertext is a random bit string.

In another embodiment of the transceiver, the source language of the original content and the target language of the cover content are the same language.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

As used herein, the term "configured to," when applied to an element, means that the element may be designed or constructed to perform a designated function, or that is has the required structure to enable it to be reconfigured or adapted to perform that function.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations conducted can often be varied, additional operations can be added, or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method comprising:
   at a sender side of a network communication between a sender and a receiver in communication network:
   encoding a ciphertext into a stegotext in a target language using a randomized language model, the ciphertext based upon an original content in a source language, the stegotext randomly generated by the language model decoupled from the original content and having an assigned context in the target language that corresponds to the network communication in the target language;
   transmitting the stegotext to a receiver over multiple communication channels of a communication network using one or more applications on an application layer of the communication network; and at a receiver side of the network communication:

inverting the received stegotext to retrieve the original content by the language model decoding the received stegotext into encrypted ciphertext and decrypting the encrypted ciphertext to retrieve the original content, further including:

extracting one or more bit chunks of the encrypted ciphertext;

tracking a conditional probability distribution of each bit chunk in each recurrent step; and deriving an encoded bit chunk based on the probability score of the token in the stegotext.

2. The method of claim 1, where prior to transmitting the stegotext to the receiver, further comprising:

generating a plurality of messages of the stegotext; and transmitting the plurality of messages of the stegotext to the receiver by distributing the plurality of messages across a plurality of communication channels using the one or more applications.

3. The method of claim 1, where prior to transmitting the stegotext to the receiver, further comprising an automatic machine translation (MT) system translating the stegotext into the target language.

4. The method of claim 1, where the network communication is a network conversation between the sender and the receiver and responsive to the receiver receiving the stegotext, further comprising at the receiver side of the network conversation:

generating using the language model reply stegotext in the target language, where the reply stegotext is decoupled from the original content and has a context responsive to the stegotext received from the sender in the target language of the network conversation; and transmitting to the sender the reply stegotext across one or more communication channels of the communication network using the one or more applications.

5. The method of claim 1, where the randomized language model converting the ciphertext into the stegotext in the target language includes the randomized language model generating one or more portions of a multi-modal stegotext.

6. The method of claim 5, where the one or more portions of the multi-modal stegotext include one or more of text, audio, image and voice.

7. The method of claim 5, the randomized language model converting the original content into multi-modal cover content having text and audio responsive to receiving a ciphertext encrypted from the original content and one or more characteristics for an audio portion of the multi-modal stegotext, the text and the audio of the multi-modal stegotext measured in bits.

8. The method of claim 5, where the original content is a voice message and prior to encoding the ciphertext into the stegotext, transcribing the voice message to a text message.

9. The method of claim 1, the ciphertext generated by encrypting the original content into a random bit string.

10. The method of claim 9, further comprising encrypting the original content into the random bit string using a secret key shared by the sender and the receiver.

11. The method of claim 10, where the shared secret key is established by a key exchange protocol based on a public key certificate.

12. The method of claim 1, where the source language of the original content and the target language of the stegotext are the same language.

13. The method of claim 1, where encoding the ciphertext, via the language model, by controlling how a next token is chosen at recurrent steps further comprising:

choosing the next token to be sampled based on a probability distribution determined by the language model and the ciphertext.

14. The method of claim 13, where the language model is a byte-level language model or a subword language model that generates a byte in each recurrent step.

15. The method of claim 1, the context of the stegotext generated by the language model being coherent to one or more of operational context and dialog context.

16. The method of claim 1, the language model applying chatbots to randomly generate the context of the stegotext, the stegotext having randomized frequency and time characteristics.

17. The method of claim 16, the user profiles of the sender and receiver of the network communication and metadata of the network communication are obfuscated by the chatbots.

18. A method comprising:

at a receiver side of a network communication between a sender and a receiver in a communication network:

inverting received stegotext to retrieve original content, the stegotext including a ciphertext encoded into the stegotext in a target language using a randomized language model and the ciphertext based upon an original content in a source language, the inverting including:

the language model decoding the received stegotext into encrypted ciphertext; and decrypting the encrypted ciphertext to retrieve the original content, further comprising the language model at the receiver side of the network communication:

extracting one or more bit chunks of the encrypted ciphertext;

tracking a conditional probability distribution of each bit chunk in each recurrent step; and deriving an encoded bit chunk based on the probability score of the token in the stegotext.

19. The method of claim 18, where the network communication is a network conversation between the sender and the receiver and responsive to the receiver receiving the stegotext, further comprising at the receiver side of the network conversation:

generating using the language model reply stegotext in the target language, where the reply stegotext is decoupled from the original content and has a context responsive to the stegotext received from the sender in the target language of the network conversation; and transmitting to the sender the reply stegotext across one or more communication channels of the communication network using the one or more applications.

20. The method of claim 18, where the source language of the original content and the target language of the stegotext are the same language.

21. The method of claim 18, the context of the stegotext generated by the language model being coherent to one or more of operational context and dialog context.

22. The method of claim 18, the language model applying chatbots to randomly generate the context of the stegotext, the stegotext having randomized frequency and time characteristics.

23. The method of claim 22, the user profiles of the sender and receiver of the network communication and metadata of the network communication are obfuscated by the chatbots.

\* \* \* \* \*